United States Patent
Usui et al.

(10) Patent No.: US 10,812,261 B2
(45) Date of Patent: Oct. 20, 2020

(54) VEHICLE SYSTEM AND KEY DISTRIBUTION METHOD

(71) Applicant: FUJITSU LIMITED, Kawasaki-shi, Kanagawa (JP)

(72) Inventors: Kenta Usui, Kawasaki (JP); Yasuhiko Abe, Niiza (JP); Naoki Suzuki, Yamato (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 16/597,264

(22) Filed: Oct. 9, 2019

(65) Prior Publication Data

US 2020/0044842 A1 Feb. 6, 2020

Related U.S. Application Data

(63) Continuation of application No. PCT/JP2017/016859, filed on Apr. 27, 2017.

(51) Int. Cl.
*H04L 29/06* (2006.01)
*H04L 9/08* (2006.01)
(Continued)

(52) U.S. Cl.
CPC ............ *H04L 9/0891* (2013.01); *G08G 1/092* (2013.01); *G08G 1/161* (2013.01); *H04L 9/0822* (2013.01);
(Continued)

(58) Field of Classification Search
None
See application file for complete search history.

(56) References Cited

U.S. PATENT DOCUMENTS 9,331,854 B2 * 5/2016 Oguma ................ H04L 9/32
9,705,678 B1 * 7/2017 Wang .................. H04L 63/1466
(Continued)

FOREIGN PATENT DOCUMENTS

JP 2004-343626 A 12/2004
JP 2005-244313 A 9/2005
(Continued)

OTHER PUBLICATIONS

Ansari, Mohammad Raashid et al. IntelliCAN: Attack-resilient Controller Area Network (CAN) for secure automobiles. 2015 IEEE International Symposium on Defect and Fault Tolerance in VLSI and Nanotechnology Systems (DFTS). https://ieeexplore.ieee.org/stamp/stamp.jsp?tp=&arnumber=7315168 (Year: 2015).*
(Continued)

*Primary Examiner* — Jeremiah L Avery
(74) *Attorney, Agent, or Firm* — Fujitsu Patent Center

(57) ABSTRACT

A vehicle system includes a plurality of electronic control devices respectively includes a first processor configured to control each unit of a vehicle; and a management electronic control device that includes a second processor configured to manage the plurality of electronic control devices, wherein when an encryption key used to verify a message is updated to another encryption key, the second processor transmits a first message that includes a controller area network identifier (CAN-ID) that identifies the message and a second message that includes the another encryption key to a network, and when the CAN-ID of the message included in the first message is a CAN-ID to be processed, the first processor updates the encryption key used to verify the message to the another encryption key included in the second message.

10 Claims, 33 Drawing Sheets

(51) Int. Cl.
*G08G 1/09* (2006.01)
*G08G 1/16* (2006.01)
*H04L 9/14* (2006.01)
*H04L 12/40* (2006.01)
*H04L 29/08* (2006.01)
*H04W 80/02* (2009.01)

(52) U.S. Cl.
CPC .............. *H04L 9/14* (2013.01); *H04L 12/40* (2013.01); *H04L 63/068* (2013.01); *H04L 63/0846* (2013.01); *H04L 67/12* (2013.01); *H04W 80/02* (2013.01); *H04L 2012/40215* (2013.01); *H04L 2209/84* (2013.01)

(56) References Cited

U.S. PATENT DOCUMENTS

| | | | |
|---|---|---|---|
| 2005/0187674 A1 | 8/2005 | Ando | |
| 2005/0195975 A1* | 9/2005 | Kawakita | H04L 9/0825 380/30 |
| 2011/0093639 A1* | 4/2011 | Richards | H04L 12/40032 710/310 |
| 2013/0230173 A1 | 9/2013 | Hori | |
| 2016/0297401 A1 | 10/2016 | Haga et al. | |
| 2016/0344764 A1 | 11/2016 | Otsuka | |
| 2017/0070488 A1* | 3/2017 | Jun | H04L 63/061 |
| 2017/0134382 A1* | 5/2017 | Darnell | H04L 12/40 |

FOREIGN PATENT DOCUMENTS

| | | |
|---|---|---|
| JP | 2007-214696 A | 8/2007 |
| JP | 2012-39245 A | 2/2012 |
| JP | 2017-038143 | 2/2017 |
| WO | 2012/101721 A1 | 8/2012 |

OTHER PUBLICATIONS

Wampler, David et al. Security Threats and Countermeasures for Intra-vehicle Networks. 2009 Fifth International Conference on Information Assurance and Security. https://ieeexplore.ieee.org/stamp/stamp.jsp?tp=&arnumber=5283124 (Year: 2009).*

Takeshi Sugashima et al., "Approaches for Secure and Efficient In-Vehicle Key Management", SAE International Journal of Passenger Cars—Electronic and Electrical Systems, pp. 140-149, 2016. [Cited in Extended European Search Report (EESR) filed herewith].

[EESR] Extended European Search Report of European Patent Application No. 17906894.5 dated Jan. 30, 2020.

Takeshi Sugashima et al., "Approaches for Secure and Efficient in Vehicle Key Management", 2016 SCIS (Symposium on Cryptography and Information Security); The Institute of Electronics, Information and Communication Engineers pp. 1-6 (18 pages)

International Search Report and Written Opinion of the International Searching Authority (Form PCT/ISA/210, 220, and 237), mailed in connection with PCT/JP2017/016859 and dated Aug. 28, 2012 (8 pages).

EPOA—Office Action of European Patent Application No. 17906894.5 dated Jul. 6, 2020.

* cited by examiner

FIG. 3

| SOF | CAN-ID (DESTINATION) | RTR | CONTROL FIELD | DATA FIELD (0 TO 8 BYTE) | CRC SEQUENCE | CRC DELIMITER | ACK SLOT | ACK DELIMITER | EOF |
|---|---|---|---|---|---|---|---|---|---|
| 1bit | 11bit | 1bit | 6bit | 0 TO 64bit | 1bit | 1bit | 1bit | 1bit | 7bit |

FIG. 5

| MESSAGE | CAN-ID (DESTINATION) | DATA FIELD |
|---|---|---|
| M1 | (EXAMPLE) CAN ID 0x101 | UID TO BE UPDATED (DEVICE ID OF ECU) SLOT OF ENCRYPTION KEY |
| M2 | (EXAMPLE) CAN ID 0x102 | COUNTER VALUE NEW ENCRYPTED KEY |
| M3 | (EXAMPLE) CAN ID 0x103 | MAC VALUE DERIVED FROM M1 AND M2 |
| M4 | (EXAMPLE) CAN ID 0x104 | UPDATED UID OF ECU SLOT OF ENCRYPTION KEY ENCRYPTED COUNTER VALUE |
| M5 | (EXAMPLE) CAN ID 0x105 | MAC VALUE DERIVED FROM M4 |

FIG. 9

| MESSAGE | CAN-ID (DESTINATION) | DATA FIELD |
|---|---|---|
| M0 | (EXAMPLE) CAN ID 0x100 | CAN ID TO BE DISTRIBUTED (EXAMPLE: CAN ID 0 × 001)<br>COUNTER VALUE<br>MAC DERIVED FROM THESE |
| M1 | (EXAMPLE) CAN ID 0x101 | CAN ID TO BE DISTRIBUTED<br>(EXAMPLE: CAN ID 0 × 001) |
| M2 | (EXAMPLE) CAN ID 0x102 | NEW ENCRYPTED KEY<br>COUNTER VALUE |
| M3 | (EXAMPLE) CAN ID 0x103 | MAC DERIVED FROM M1 AND M2 |
| M4 | (EXAMPLE) CAN ID 0x104 | UPDATED UID OF ECU<br>SLOT OF ENCRYPTION KEY<br>ENCRYPTED COUNTER VALUE |
| M5 | (EXAMPLE) CAN ID 0x105 | MAC DERIVED FROM M4 |

FIG. 10

[INFORMATION HELD BY SLAVE ECU]

COMMON KEY : Master_ECU_Key
UID OF DEVICE : UID C

| CANID | COUNTER VALUE | KEY SLOT | KEY | MAC VALUE |
|---|---|---|---|---|
| 0x001 | COUNTER VALUE A | KEY SLOT c1 | KEY1 | MAC VALUE cA |
| 0x002 | COUNTER VALUE B | KEY SLOT c2 | *** | MAC VALUE cB |
| 0x003 | COUNTER VALUE C | KEY SLOT c3 | *** | MAC VALUE cC |
| 0x004 | COUNTER VALUE D | KEY SLOT c4 | *** | MAC VALUE cD |
| 0x005 | COUNTER VALUE E | KEY SLOT c5 | *** | MAC VALUE cE |
| *** | *** | *** | *** | *** |

[INFORMATION HELD BY MASTER ECU]

COMMON KEY : Master_ECU_Key

| CANID | COUNTER VALUE | KEY | MAC VALUE |
|---|---|---|---|
| 0x001 | COUNTER VALUE A | KEY1 | MAC VALUE mA |
| 0x002 | COUNTER VALUE B | KEY2 | MAC VALUE mB |
| 0x003 | COUNTER VALUE C | KEY3 | MAC VALUE mC |
| 0x004 | COUNTER VALUE D | KEY4 | MAC VALUE mD |
| ... | ... | ... | ... |

1101

| CANID | ECUA KEY SLOT | ECUB KEY SLOT | ECUC KEY SLOT | ... | MASTER ECUC KEY SLOT |
|---|---|---|---|---|---|
| 0x001 | KEY SLOT a1 | – | KEY SLOT c1 | ... | – |
| 0x002 | KEY SLOT a2 | KEY SLOT b1 | KEY SLOT c2 | ... | – |
| 0x003 | KEY SLOT a3 | KEY SLOT b2 | KEY SLOT c3 | ... | – |
| 0x004 | KEY SLOT a4 | KEY SLOT b3 | KEY SLOT c4 | ... | – |
| ... | ... | ... | ... | ... | ... |
| 0x100 | – | – | – | ... | COMMON KEY |
| 0x104 | – | – | – | ... | COMMON KEY |
| 0x105 | – | – | – | ... | TARGET |
| ... | ... | ... | ... | ... | ... |

1102

| ECU | ECUA | ECUB | ECUC | ... |
|---|---|---|---|---|
| UID | UID_A | UID_B | UID_C | ... |

1103

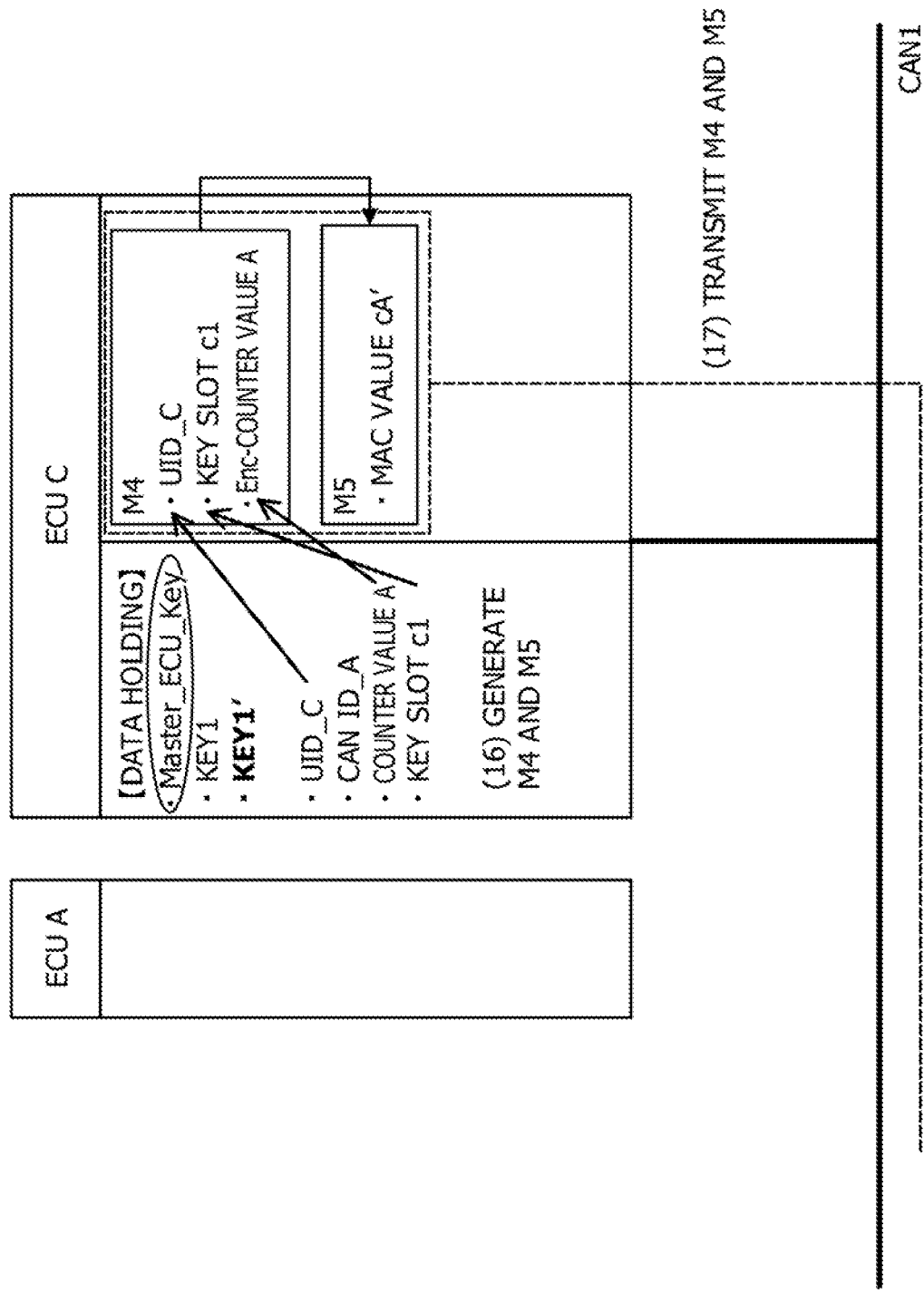

VEHICLE SYSTEM AND KEY DISTRIBUTION METHOD

CROSS-REFERENCE TO RELATED APPLICATION

This application is a continuation application of International Application PCT/JP2017/016859 filed on Apr. 27, 2017 and designated the U.S., the entire contents of which are incorporated herein by reference.

FIELD

The present invention relates to a vehicle system and a key distribution method.

BACKGROUND

An ECU is used to control each unit in a vehicle. The ECU is an abbreviation for, for example, engine control unit (engine control unit, engine control device) or electronic control unit (electronic control unit, electronic control device). Then, to secure security strength against a cyberattack to a vehicle (maintain confidentiality, availability, and completeness of system), an encryption technology is used throughout the ECU. For example, the ECU uses an encryption key in exchange of a message which requires to secure confidentiality and authenticity. It is desirable that the encryption key be securely and efficiently stored in the ECU. When the same key is continuously used, security is deteriorated. Therefore, the encryption key is updated (generation and distribution of key).

Furthermore, in recent years, an automated driving technology attracts attention. The automated driving technology is, for example, a technology for automatically controlling traveling of the vehicle without an operation by a person.

Patent Document 1: International Publication Pamphlet No. 2012/101721
Patent Document 2: Japanese Laid-open Patent Publication No. 2012-39245
Patent Document 3: Japanese Laid-open Patent Publication No. 2004-343626
Non-Patent Document
Non-Patent Document 1: "Approaches for Secure and Efficient In-Vehicle Key Management", IEICE Transactions on Fundamentals of Electronics, Communications and Computer Sciences, 2016

For example, if the automated driving technology advanced, it is expected that complete autonomous traveling is realized. However, for development of such an automated driving technology, for example, it is required to more rapidly communicate a message for controlling traveling such as to travel, to turn, and to stop, and it is desirable to reduce a network load of the communication between the ECUs even slightly. Therefore, improvement in an efficiency of the encryption key distribution is desired.

SUMMARY

According to an aspect of the embodiments, a vehicle system includes a plurality of electronic control devices respectively includes a first processor configured to control each unit of a vehicle; and a management electronic control device that includes a second processor configured to manage the plurality of electronic control devices, wherein when an encryption key used to verify a message is updated to another encryption key, the second processor transmits a first message that includes a controller area network identifier (CAN-ID) that identifies the message and a second message that includes the another encryption key to a network, and when the CAN-ID of the message included in the first message is a CAN-ID to be processed, the first processor updates the encryption key used to verify the message to the another encryption key included in the second message.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating a configuration of a data frame of a message in CAN communication;
FIG. 5 is a diagram for explaining a message used in exemplary key distribution processing;
FIG. 9 is a diagram for explaining a message used in key distribution processing according to the embodiment;
FIG. 10 is a diagram illustrating information held by a storage unit of the ECU;
FIG. 11 is a diagram illustrating information held by a storage unit of the master ECU;
FIGS. 24A and 24B are diagrams for explaining a flow of the key distribution processing according to the embodiment;

DESCRIPTION OF EMBODIMENTS

Figure 1:
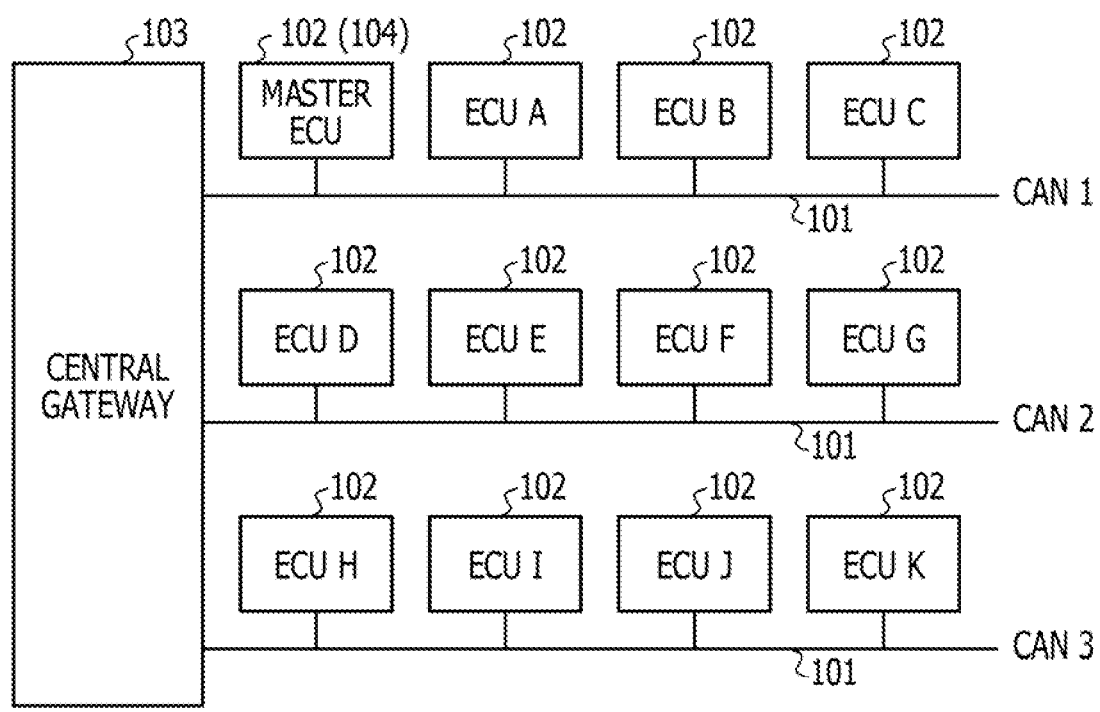
FIG. 1 is a diagram illustrating a configuration of a CAN network of a vehicle system.

Hereinafter, several embodiments of the present invention will be described in detail with reference to the drawings. Note that corresponding elements in a plurality of drawings are denoted with the same reference numeral.

FIG. 1 is a diagram illustrating a configuration of a controller area network (CAN) network 101 of a vehicle system 100. In FIG. 1, for example, a plurality of ECUs 102 is connected to the CAN network 101 of each of a CAN 1, a CAN 2, and a CAN 3. Furthermore, the plurality of CAN networks 101 is connected to a central gateway 103. Note that it is not necessary to include the central gateway 103 in the vehicle system 100. The ECUs 102 include an ECU which operates as a master ECU (Master ECU) 104. The master ECU 104 and each ECU 102 may have the same hardware configuration, operating software may be different. The plurality of master ECUs 104 may be included in the vehicle system 100. For example, each of the CAN 1, the CAN 2, and the CAN 3 may include the master ECU 104. The master ECU 104 may, for example, generate an encryption key used for generation of information such as a message authentication code used to execute verification such as MAC verification and distribute the generated encryption key to the other ECU 102. It is possible that the master ECU 104 and the ECU 102 which is a distribution destination of the encryption key are included in or not included in the same CAN network 101. For example, in FIG. 1, the master ECU 104 may distribute the keys to the ECUs included in the CAN 1, the CAN 2, and the CAN 3. The ECU 102 is arranged in each unit of a vehicle, each ECU 102 may control and monitor an operation of the corresponding device. For example, the ECU 102 connected to a motor controls the motor, and the ECU 102 connected to a wiper controls the wiper. Furthermore, the ECU 102 may control the speed of the vehicle, the rotation speed of the engine, the state of the brake, and the like. Then, for example, the vehicle system 100 may control an operation of an entire vehicle by communicating messages between the ECUs 102. Note that, hereinafter, there is a case where the ECU 102 is referred to as, for example, an engine control device or an electronic control device. Furthermore, there is a case where the Master ECU 104 is referred to as, for example, a management engine control device or a management electronic control device.

Figure 2:
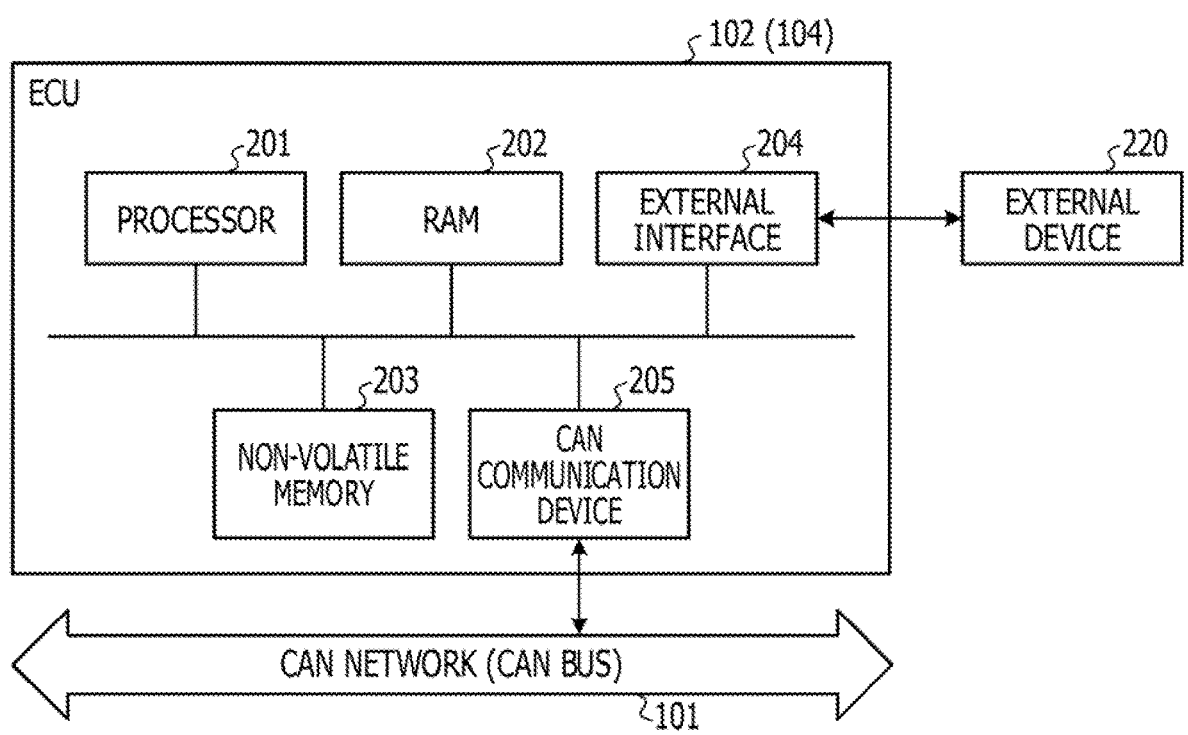
FIG. 2 illustrates a hardware configuration of an ECU.

FIG. 2 is a diagram illustrating a hardware configuration of the ECU 102 (master ECU 104). The ECU 102 includes, for example, a processor 201, a RAM 202, a non-volatile memory 203, an external interface 204, and a CAN communication device 205. Note that the RAM is an abbreviation for random access memory. The processor 201, the RAM 202, the non-volatile memory 203, the external interface 204, and the CAN communication device 205 may be connected to each other, for example, via a bus 210.

The processor 201 may be, for example a single processor, a multiprocessor, or a multicore. The processor 201 may control each unit of the ECU by reading and executing a program in the RAM 202 The non-volatile memory 203 may be, for example, a semiconductor memory such as a flash memory. For example, the CAN communication device 205 is connected to the CAN network 101 (CAN bus) according an instruction by the processor 201 and communicates with the other ECU 102. Furthermore, the external interface 204 may, for example, be connected to an external device 220 according to an instruction by the processor 201 and control the external device 220. The external device 220 represents, for example, a device of a vehicle to be controlled by the ECU 102. For example, when the ECU 102 is an ECU 102 which controls the motor, the external device 220 is the motor. If the ECU 102 was an ECU 102 which controls the wiper, the external device 220 is the wiper. Note that the master ECU 104 may have, for example, a hardware configuration same as that of the ECU 102, and operating software may be different.

Subsequently, a CAN communication protocol will be described. Note that the CAN communication protocol is, for example, a serial communication protocol internationally standardized by the ISO.

[CAN Communication Protocol]

The CAN communication protocol is, for example, a standard designed to enhance noise resistance and is used to transfer data between the devices connected to each other. In automobiles, for example, the CAN communication protocol is used to transfer information such as the speed, the rotation speed of the engine, the state of the brake, and failure diagnosis, and the like.

FIG. 3 illustrates a configuration of a data frame of a message in the CAN communication. Each field in FIG. 3 represents the following items.

Start of frame (SOF): represents the start of the data frame

CAN-ID (Identifier): ID of a CAN representing a destination of a message

Remote transmission request (RTR): identifies a data frame and a remote frame

Control: represents reserved bits (r0, r1) and a data length (Data Length Code (DLC))

Data field: data content

Cyclic redundancy check (CRC): checks for frame transmission errors

Acknowledgement (ACK): reply in a case of successful reception

End of frame (EOF): represents the end of the data frame

In the example of the message in FIG. 3, the CAN-ID is defined by 11 bits. Each ECU 102 specifies a CAN-ID to be a destination and transmits data (single frame includes zero to eight bytes) to the CAN network. The CAN-ID is, for example, an identifier for identifying each message. Each ECU 102 processes only data of which a CAN-ID related the ECU 102 is specified. Therefore, the CAN-ID represents, for example, a destination of the message. Note that data M0 to M5 described later is data of the data field.

Subsequently, verification of authenticity of the message in the CAN network will be described. As a method for verifying the authenticity of the message, verification using a message authentication code (MAC) value is known. The MAC value is short information used to authenticate the message. A MAC algorithm receives an encryption key and a message having an arbitrary length to be authenticated as inputs and outputs a MAC value. By using the MAC value, for example, the ECU 102 can detect a change in content of the message and can protect the completeness of the message. For example, the MAC value may be used for the verification of the authenticity of the message as illustrated in FIG. 4.

Figure 4:
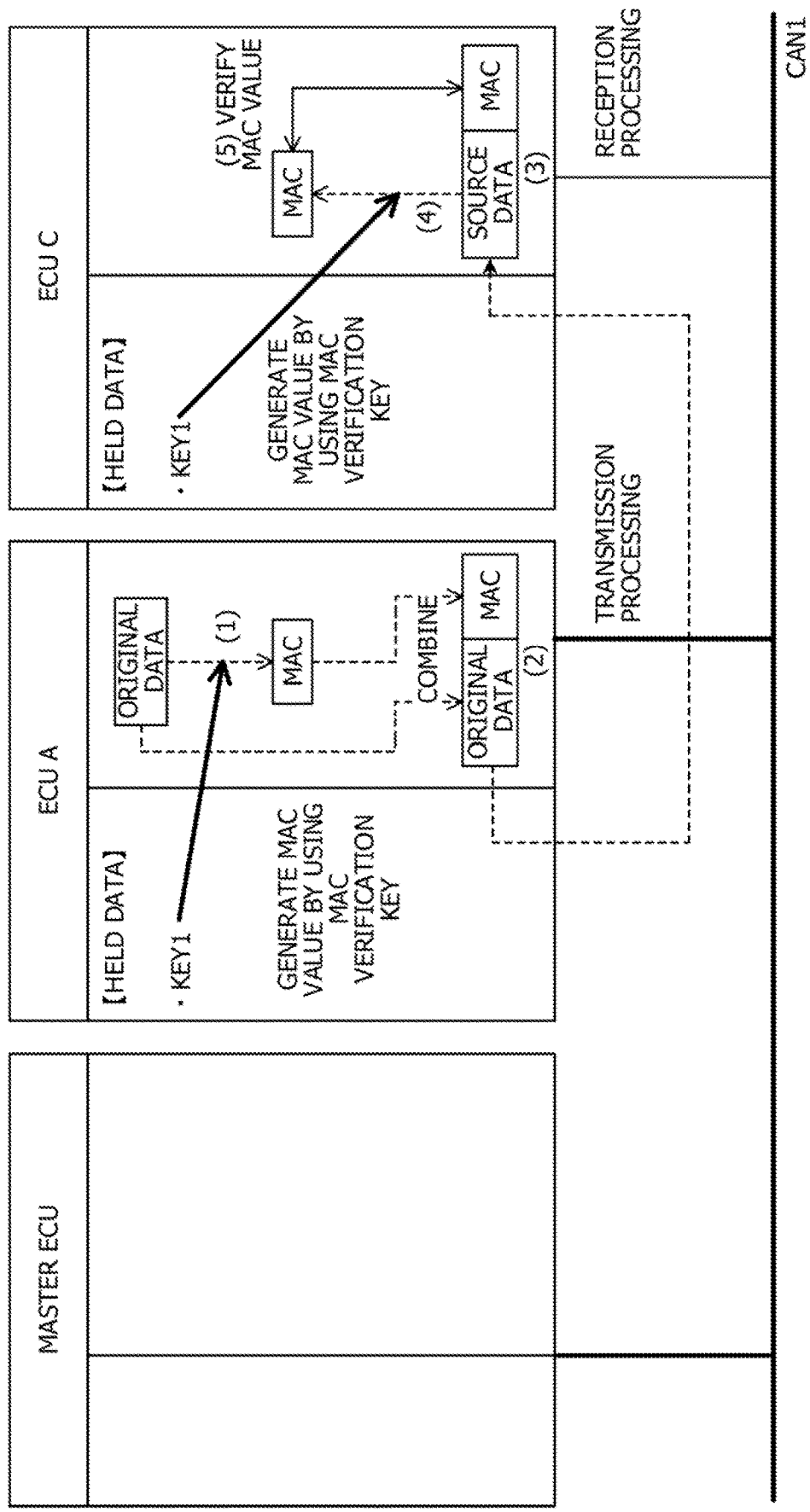
FIG. 4 is a diagram illustrating verification of authenticity of the message according to an exemplary MAC value.

FIG. 4 is a diagram illustrating the verification of the authenticity of the message according to an exemplary MAC value. In FIG. 4, an ECU 102-A generates a MAC value (verification data) from original data by using a held encryption key (KEY1) ((1) in FIG. 4). Then, the ECU 102-A designates a predetermined CAN-ID and outputs a message in which the generated MAC value is added to the original data to the CAN network ((2) in FIG. 4). Note that the message output to the CAN network may be, for example, broadcasted.

Then, an ECU 102-C collects messages, in which the CAN-ID to be processed is designated as a destination CAN-ID, from among the messages transmitted on the CAN network. Here, the ECU 102-C may collect messages including the original data to which the MAC value is added output by the ECU 102-A ((3) in FIG. 4). Then, the ECU 102-C generates a MAC value from the received original data by using the held encryption key (KEY1) ((4) in FIG. 4) and verifies whether or not the generated MAC value coincides with the received MAC value ((5) in FIG. 4). Thus, the ECU 102-C can confirm authenticity of the original data. For example, as described above, the authenticity of the message can be confirmed according to the MAC value generated by using the encryption key.

Here, for example, if the encryption key (KEY1) for MAC verification was continuously used for a long time, security is deteriorated, and a possibility of success in a security attack is increased. Therefore, the encryption key is updated (key generation and distribution) so as to maintain the high security.

In the following description, an example of key distribution processing will be described in which the master ECU 104 distributes a new key to an ECU 102 which is a key distribution target. For example, as the security of the ECU 102, the secure hardware extension (SHE) method has been known, and key distribution using the SHE method will be described below. In the SHE method, for example, messages referred to as M1, M2, M3, M4, and M5 are exchanged by using the CAN communication protocol.

FIG. 5 is a diagram for explaining the messages referred to as M1, M2, M3, M4, and M5 which are used in exemplary key distribution processing. As Illustrated in FIG. 5, the M1 message includes information specifying a unique ID (UID) used to identify the ECU 102 that uses the encryption key that is a key distribution target and a slot where the encryption key that is a key distribution target is stored. Furthermore, the M2 message may include a counter value for preventing a replay and a new encryption key which has been encrypted. The M3 message includes information regarding a MAC value derived from the M1 message and the M2 message. The M4 message includes, for example, information regarding a UID of the ECU 102 of which the encryption key is updated, a slot storing the new encryption key, and an encrypted counter value for preventing a replay. The M5 message includes, for example, a MAC value derived from the M4 message. Furthermore, in the message, an individual CAN-ID may be specified as the destination of the message.

Figure 6A:
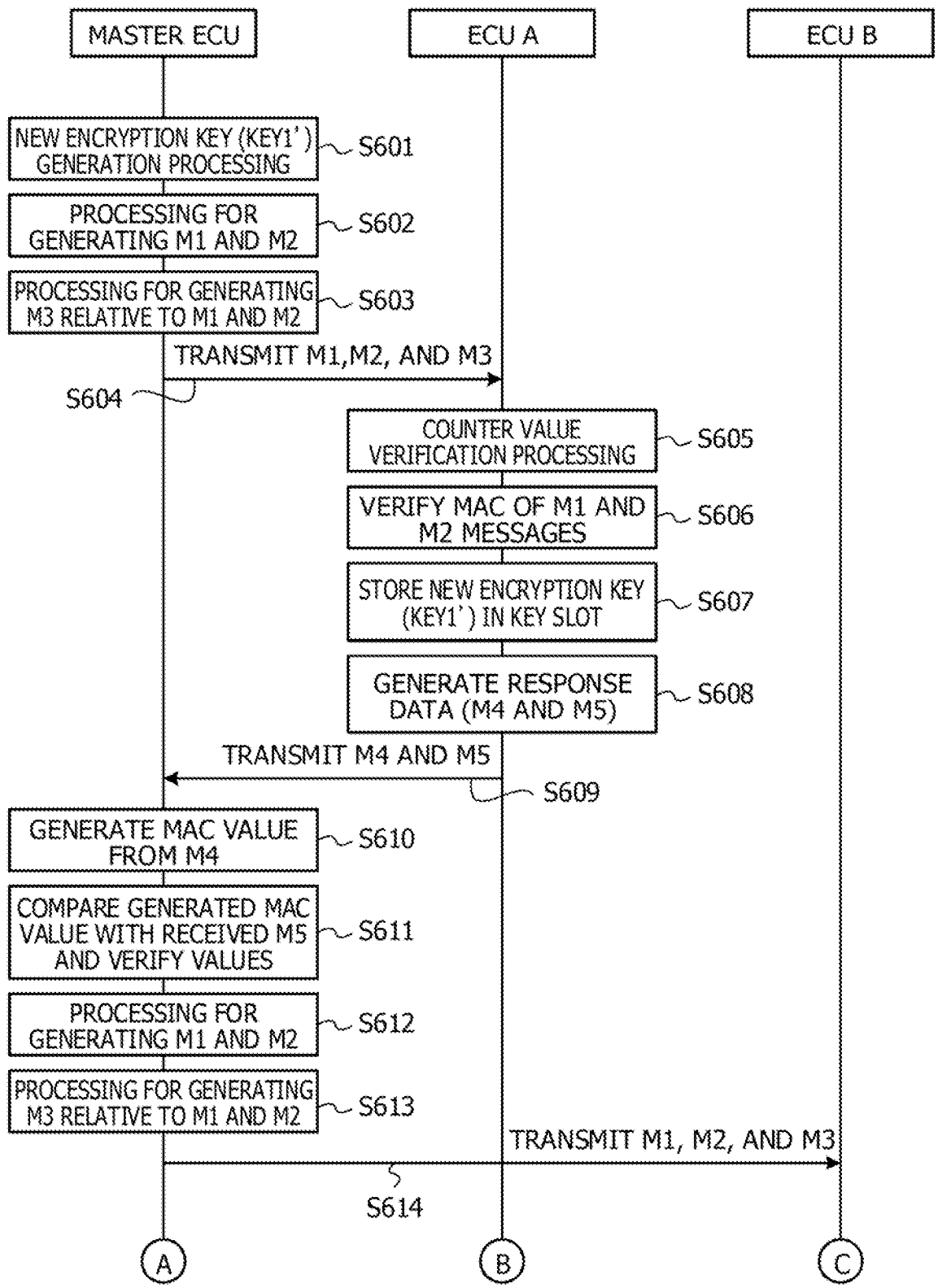
FIGS. 6A and 6B are sequence diagrams illustrating exemplary key distribution from a master ECU to a key distribution target ECU.

FIGS. 6A and 68 are sequence diagrams illustrating exemplary key distribution from the master ECU 104 to the ECU 102-A and the ECU 102-C which are key distribution targets. For example, the master ECU 104 may start the sequence in FIG. 6A at a predetermined timing such as a timing when a predetermined period of time has elapsed from the generation of the encryption key and the encryption key used for the verification of the message becomes old. Note that, in the sequence in FIG. 6A, it is assumed that the encryption key to be updated be used to verify the message identified by a predetermined CAN-ID exchanged between the ECU 102-A and the ECU 102-C.

In step 601 (hereinafter, step is described as "S", and for example described as S601), the master ECU 104 generates a new encryption key (KEY1'). Subsequently, the master ECU 104 generates the M1 message and the M2 message. Note that, for example, as described in FIG. 5, the M1 message includes the information regarding the UID of the ECU 102 of which the encryption key is updated and the slot where the encryption key is stored in the data field. Furthermore, for example, as described in FIG. 5, the M2 message includes the counter value for preventing a replay and the new encryption key encrypted by a common key in the data field. Note that the common key is, for example, an encryption key which is commonly held by the master ECU 104 and other ECU 102.

In S603, the master ECU 104 generates the M3 message (including MAC value derived from M1 message and M2 message in data field) from the M1 message and the M2 message by using the common key.

In S604, the master ECU 104 transmits the generated M1, M2, and M3 messages to the CAN network. On the other hand, the ECU 102-A confirms the CAN-ID of the destination of the message transmitted on the CAN network and collects a message having a CAN-ID of a processing target. Moreover, in a case where the CAN-ID of the collected message is the M1 message, the ECU 102-A determines whether or not the UID included in the data field of the M1 message coincides with the UID allocated to the ECU102-A. Then, in a case where the UID included in the data field coincides with the UID of the ECU102-A, the ECU 102-A processes the M1 message and the subsequent M2 and M3 messages as messages for the ECU102-A. Here, it is assumed that the UID in the data field of the M1 message be the UID of the ECU 102-A. Therefore, the ECU 102-A acquires the M1, M2, and M3 messages transmitted from the master ECU 104 as the messages for the ECU102-A.

In S605, the ECU 102-A verifies a counter value included in the acquired M2 message. For example, each ECU 102 may store a counter value corresponding to the key to be used in the non-volatile memory 203. Then, the ECU 102-A determines whether or not a difference between the counter value included in the M2 message and the counter value associated with the key to be updated stored in the non-volatile memory 203 is within an allowable range. In a case where the difference between the counter values exceeds the allowable range, the ECU 102-A may discard the M1, the M2, and the M3 messages. On the other hand, if the difference between the counter values was within the allowable range, the sequence proceeds to S606.

In S606, the ECU 102-A verifies the MACs of the M1 and M2 messages by using the M3 message. For example, the ECU 102-A generates a MAC value from the M1 and M2 messages by using the common key stored in the non-volatile memory 203 and verifies whether or not the generated MAC value coincides with the MAC value included in the data field of the M3 message. In a case where the generated MAC value does not coincide with the MAC value, the ECU 102-A may discard the M1, the M2, and the M3 messages. On the other hand, in a case where the generated MAC value coincides with the MAC value, the sequence proceeds to S607.

In S607, the ECU 102-A decrypts the new encrypted key included in the M2 message by the common key and stores the new key in a slot specified by the M1 message. In S608, the ECU 102-A generates the M4 message and the M5 message. Note that the M4 message includes, for example, a UID of the ECU 102, a slot where the encryption key is stored, and the encrypted counter value for preventing a replay. Furthermore, the M5 message includes, for example, a MAC value derived from the M4 message.

In S609, the ECU 102-A transmits the generated M4 and M5 messages to the CAN network. The master ECU 104 confirms the CAN-ID of the destination of the message transmitted on the CAN network and collects a message having a CAN-ID of a processing target. For example, the CAN-IDs of the M4 and M5 messages are processing targets of the master ECU 104, and accordingly, the master ECU 104 may receive the M4 and M5 messages transmitted from the ECU 102-A.

In S610, the master ECU 104 generates a MAC value from the M4 message by using the common key. Then, in S611, the master ECU 104 verifies whether or not the generated MAC value coincides with the MAC value in the M5 message. In a case where the MAC values coincide with each other, the master ECU 104 can confirm that the key distribution to the ECU 102-A identified by the UID included in the M4 message has been completed.

In the subsequent processing in S612 to S621, the master ECU 104 and the ECU 102-C may, for example, execute processing corresponding to the processing in S601 to S611. However, unlike the processing in S601 to S611, in the processing in S612 to S621, the key is distributed to the ECU 102-C. Therefore, for example, the master ECU 104 may specify the UID of the ECU 102-C in the data field of the M1 message in S612. Then, the M1, M2, and M3 messages transmitted to the CAN network is received by the ECU 102-C in S614, and the key may be distributed to the ECU 102-C in the subsequent processing.

As described above, according to the exemplary key distribution processing, the master ECU 104 can distribute the keys to the ECU 102-A and the ECU 102-C. However, for example, in an automated driving technology and the like, it is required to more rapidly communicate a message for controlling traveling such as to travel, to turn, and to stop, and it is desirable to reduce a network load of the communication between the ECUs 102 even slightly. Therefore, improvement in the efficiency of the encryption key update is desired.

An embodiment to be described later enables the master ECU 104 to distribute the keys to all the ECUs 102 that require the key distribution at one time. Therefore, as illustrated in FIG. 6A, unlike a case where the ECU 102 that is a key distribution target is individually specified by the UID and the key is individually distributed to the ECU 102, the efficiency in the encryption key update can be improved. Hereinafter, key distribution processing according to the embodiment will be further described in detail.

<Embodiment>

Figure 7:
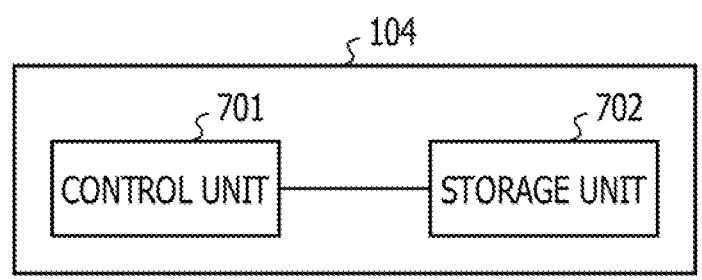
FIG. 7 is a diagram illustrating a block configuration of the master ECU according to an embodiment.

FIG. 7 is a diagram illustrating a block configuration of the master ECU 104 according to the embodiment. The master ECU 104 includes, for example, a control unit 701 and a storage unit 702. The storage unit 702 of the master ECU 104 stores information, for example, a common key to be described later, master CAN communication information 1101, message processing target information 1102, ECU identification information 1103, and the like. Note that, for example, the processor 201 described above may operate as the control unit 701 by reading and executing a program in the RAM 202. Furthermore, the RAM 202 and the non-volatile memory 203 described above are, for example, examples of the storage unit 702. Details of these units and details of the information stored in the storage unit 702 will be described later.

Figure 8:
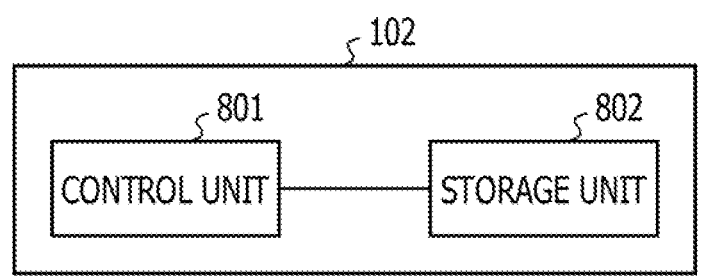
FIG. 8 is a diagram illustrating a block configuration of the ECU according to the embodiment.

Furthermore, FIG. 8 is a diagram illustrating a block configuration of the ECU 102 according to the embodiment. The ECU 102 includes, for example, a control unit 801 and a storage unit 802. The storage unit 802 of the ECU 102 stores information, for example, the common key to be described later, the UID of the ECU 102, the CAN communication information 1001, and the like. Note that, for example, the processor 201 described above may operate as the control unit 801 by reading and executing a program in the RAM 202. Furthermore, the RAM 202 and the non-volatile memory 203 described above are, for example, examples of the storage unit 802. Details of these units and details of the information stored in the storage unit 802 will be described later.

Figure 6B:
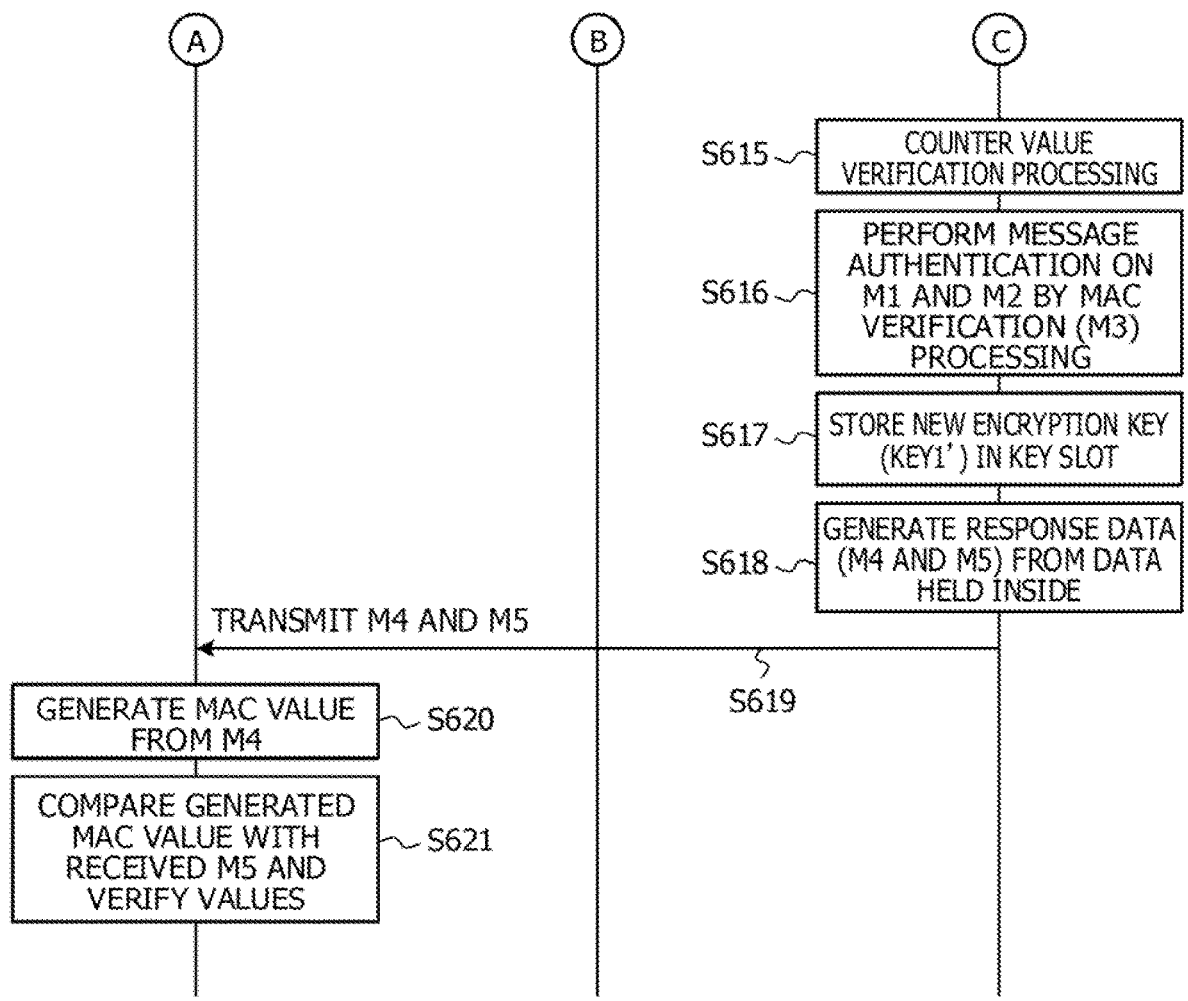

Subsequently, key distribution processing according to the embodiment will be described. In the exemplary key distribution processing in FIG. 6, an example has been described in which the master ECU 104 distributes the keys at a predetermined timing. However, for example, like a case where the ECU 102 detects an attack, there is a case where it is preferable to request the key distribution from the ECU 102 to the master ECU 104. Therefore, in the embodiment described later, in addition to the M1 to M5 messages, an M0 message in which the ECU 102 requests the master ECU 104 to execute the key distribution is provided.

FIG. 9 is a diagram for explaining the M0, the M1, the M2, the M3, the M4, and the M5 messages used in the key distribution processing according to the embodiment. As illustrated in FIG. 9, the M0 message includes a CAN-ID of a message to be verified by an encryption key which is a key distribution target, a counter value corresponding to the encryption key which is the key distribution target, and a MAC value derived from the CAN-ID and the counter value by using the common key in a data field. Note that, in the following description, there is a case where the CAN-ID of the message to be verified by the encryption key which is the key distribution target is referred to as a key-distribution-target CAN-ID. The M1 message includes a key-distribution-target CAN-ID in the data field. The M2 message includes a new encryption key encrypted by the common key and a counter value associated with the key-distribution-target CAN-ID. The M3 message includes a MAC value derived from the M1 message and the M2 message. The M4 message includes, for example, a UID of an ECU 102 of which a key is updated, a slot where the new encryption key is stored, and a counter value obtained by encrypting a counter value corresponding to the new encryption key by the common key. The M5 message includes, for example, a MAC value derived from the M4 message. Furthermore, in each message, an individual CAN-ID may be set as information indicating a destination of the message.

FIG. 10 is a diagram illustrating information held by the storage unit 802 of the ECU 102. For example, the ECU 102 may hold the common key (for example, Master_ECU_Key), the UID of the ECU 102 (for example, UID C), and the CAN communication information 1001 in the storage unit 802. The common key is an encryption key which is commonly held by the master ECU 104 and the ECU 102. The UID of the ECU 102 is a UID used to identify the ECU 102 that holds the information illustrated in FIG. 10 in the storage unit 802. The CAN communication information 1001 includes a CAN-ID of a message to be processed by the ECU 102 that holds the CAN communication information 1001 in the storage unit 802 and information regarding a counter value, a key slot, a key, and a MAC value associated with the CAN-ID. For example, the counter value is a counter value associated with the CAN-ID of an entry of the CAN communication information 1001. Furthermore, for example, the key is an encryption key used for verification in the exchange of the message identified by the CAN-ID, and the key slot is a slot where the encryption key is stored. The MAC value is a MAC value generated from the CAN-ID of the entry and the counter value by the common key. For example, the ECU 102 may hold the above information.

Furthermore, FIG. 11 is a diagram illustrating information held by the storage unit 702 of the master ECU 104. For example, the storage unit 702 may store the common key (for example, Master_ECU_Key), the master CAN communication information 1101, the message processing target information 1102, and the ECU identification information 1103. The common key is an encryption key which is commonly held by the master ECU 104 and the other ECUs 102. The master CAN communication information 1101 includes a CAN-ID of a message managed by the master ECU 104 and information regarding a counter value, a key, and a MAC value associated with the CAN-ID. For example, the counter value is a counter value associated with the CAN-ID of the entry. The key is, for example, an encryption key used for verification in the exchange of the message identified by the CAN-ID of the entry. The MAC value is a MAC value generated from the CAN-ID of the entry and the counter value by the common key.

Furthermore, the message processing target information 1102 resisters information indicating the ECU 102 which processes the message identified by the CAN-ID of the entry. For example, in the message processing target information 1102, in a case of an entry including the CAN-ID of the message in which the encryption key is used for verification, information regarding the key slot of the encryption key may be registered in the ECU 102 that processes the message and the master ECU 104. Furthermore, for example, in a case of an entry including the CAN-ID of the message in which the encryption key is not used for verification, information indicating that the message is a processing target may be registered in the ECU 102 which processes the message having the CAN-ID and the master ECU 104. Note that the information indicating that the message is the processing target is indicated as, for example, "target" in FIG. 11. Furthermore, in the example of the message processing target information 1102 in FIG. 11, the information regarding the key slot and the information indicating that the message is the processing target are not registered in the ECU 102 which does not process the message identified by the CAN-ID of the entry.

Furthermore, in the ECU identification information 1103, information indicating the UIDs of the ECUs 102 to be managed by the master ECU 104 are registered. For example, the master ECU 104 may hold the above information.

Figure 12A:
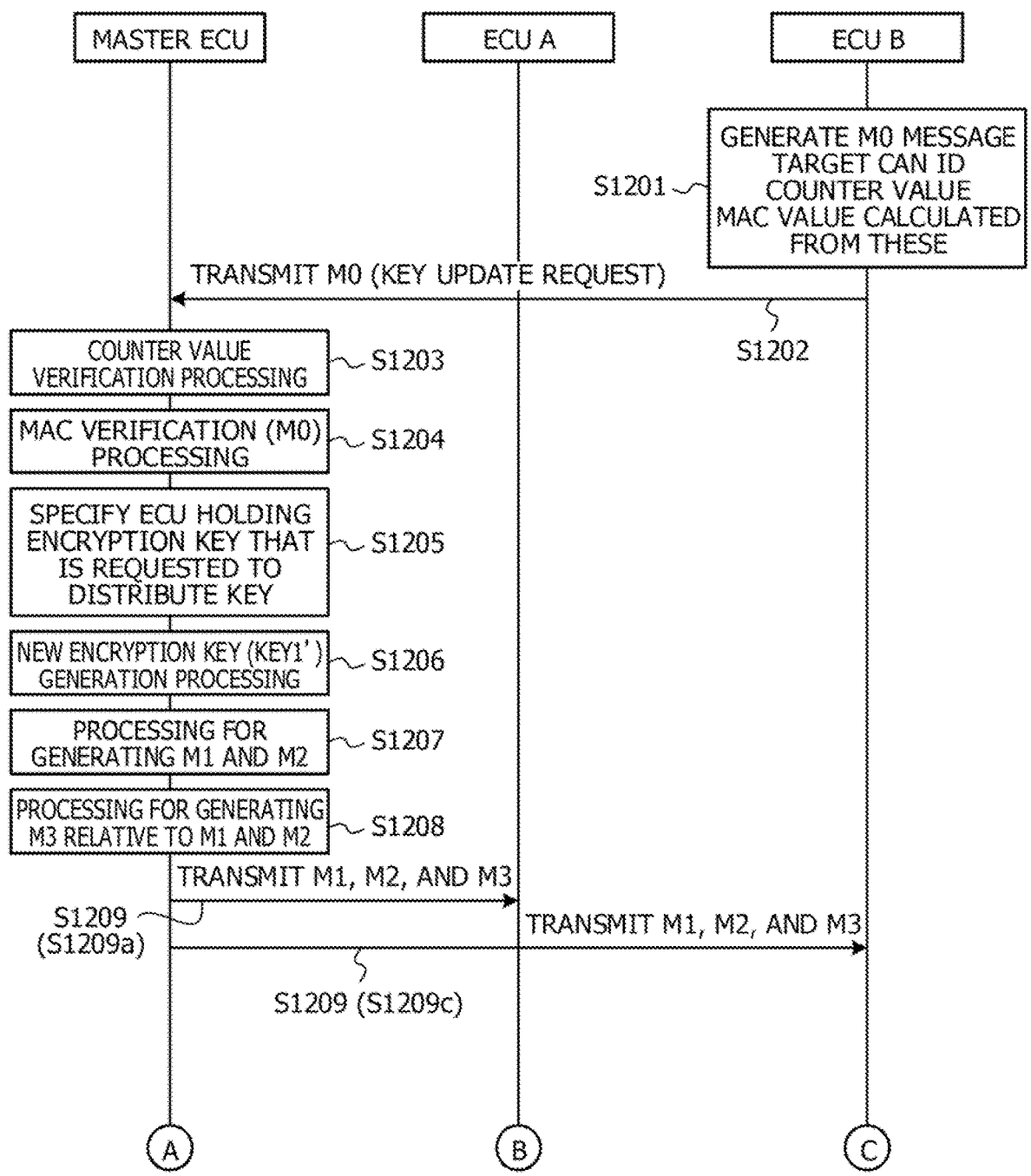
FIGS. 12A and 12B are sequence diagrams illustrating key distribution processing according to the embodiment.
Figure 12B:
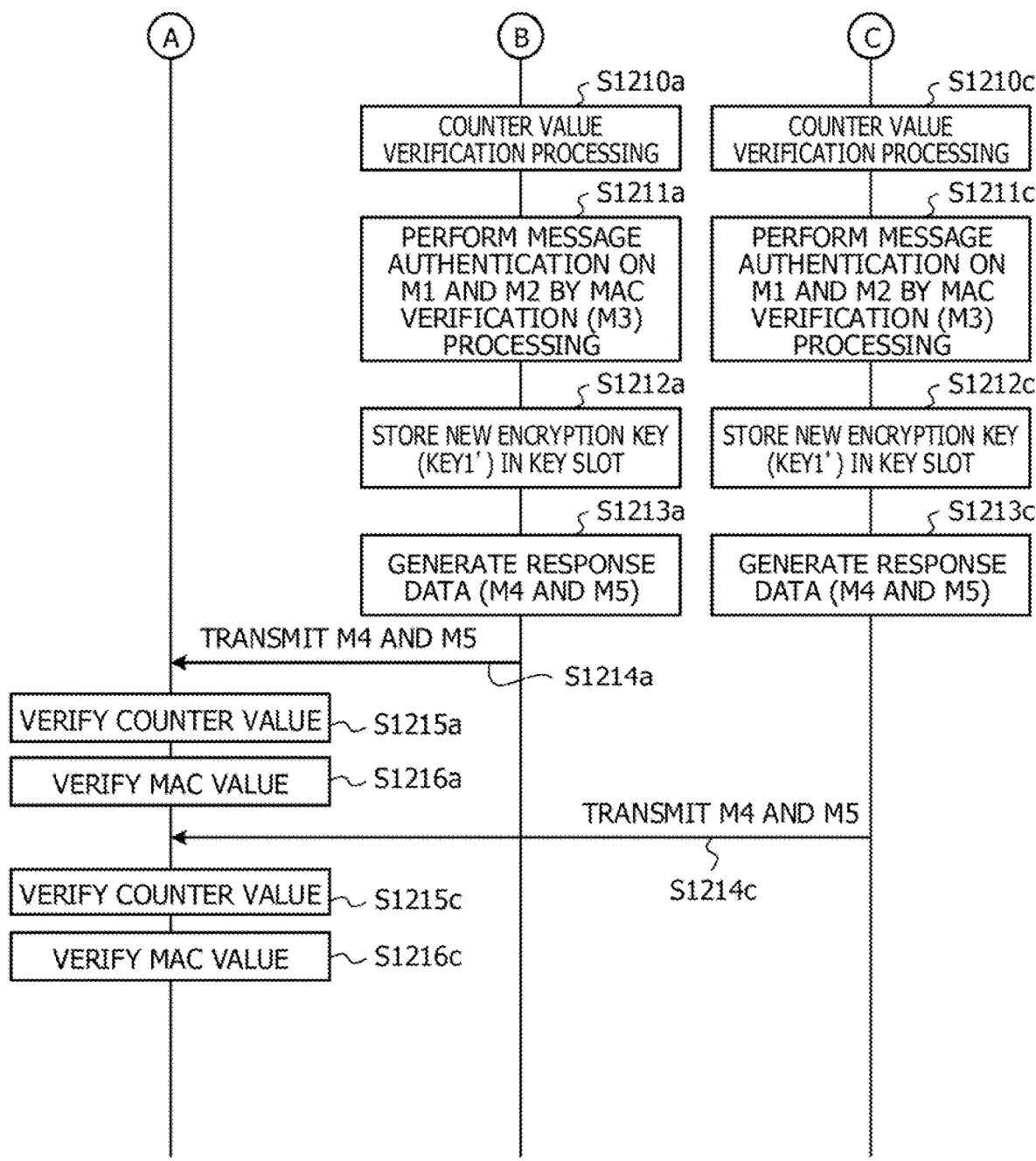

FIGS. 12A and 12B are sequence diagrams illustrating the key distribution processing according to the embodiment. For example, the control unit 801 of the ECU 102-C may start the sequence in FIGS. 12A and 12B at a predetermined timing such as a timing when a predetermined period of time has elapsed from the generation of the key and the key becomes old and a timing when being attacked.

In S1201, the control unit 801 of the ECU 102-C acquires a CAN-ID of a message verified by using an encryption key that is a key distribute request target and a counter value associated with the CAN-ID in the CAN communication information 1001. Then, the control unit 801 of the ECU 102-C generates an M0 message including the acquired CAN-ID, the counter value, and a MAC value generated from the CAN-ID and the counter value by using the common key.

In S1202, the control unit 801 of the ECU 102-C transmits the generated M0 message to the CAN network. The control unit 701 of the master ECU 104 confirms the CAN-ID of the destination of the message transmitted on the CAN network and collects a message having a CAN-ID of a processing target. For example, as indicated in the message processing target information 1102, the processing target of the master ECU 104 is a CAN-ID of the M0 message: 0x100. Therefore, the master ECU 104 may collect the M0 message transmitted from the ECU 102-C as a processing target.

In S1203, the control unit 701 of the master ECU 104 verifies whether or not the counter value associated with the CAN-ID included in the M0 message in the master CAN communication information 1101 and the counter value included in the M0 message are within a predetermined allowable range. Then, in a case where the counter values are within the predetermined allowable range, the sequence proceeds to S1204. Note that, in a case where the counter values are not within the predetermined allowable range, the control unit 701 of the master ECU 104 discards the M0 message, and the sequence may be terminated. For example, by verifying the counter value in this way, a reply attack can be detected.

In S1204, the control unit 701 of the master ECU 104 performs MAC verification whether or not the MAC value associated with the CAN-ID included in the M0 message in the master CAN communication information 1101 coincides with the MAC value included in the M0 message. In a case where the verification is successfully performed, the sequence proceeds to S1205. Note that, in a case where the verification fails, the control unit 701 of the master ECU 104 discards the M0 message, and the sequence may be terminated.

In S1205, the control unit 701 of the master ECU 104 specifies the ECU 102 that holds the encryption key that is requested to distribute the key as an ECU 102 that is a key distribution target. For example, the control unit 701 of the master ECU 104 may refer to the entry including the CAN-ID included in the M0 message in the message processing target information 1102 and specifies the ECU 102 in which the information regarding the key slot is registered as an ECU 102 that is a key distribution target.

In S1206, the control unit 701 of the master ECU 104 generates a new encryption key (KEY1'). In S1207, the control unit 701 of the master ECU 104 generates an M1 and M2 messages. For example, the control unit 701 may generate the M1 message including a key-distribution-target CAN-ID notified in the M0 message in the data field. Furthermore, the control unit 701 generates the M2 message including an encryption key obtained by encrypting the new key generated in S1206 by the common key and a counter value associated with the key-distribution-target CAN-ID in the master CAN communication information 1101 in the data field.

In S1208, the control unit 701 of the master ECU 104 acquires a MAC value from the M1 and the M2 messages generated in S1206 by using the common key and generates an M3 message including the acquired MAC value in the data field.

In S1209 (S1209a and S1209b), the control unit 701 of the master ECU 104, for example, transmits the generated M1, M2, and M3 messages to the CAN network, and then, waits for the reception of the M4 and M5 messages. The control units 801 of the ECU 102-A and the ECU 102-C collect CAN messages transmitted on the CAN network and collect a message having a CAN-ID of a destination to be processed by the ECU 102. Here, the control unit 801 of each of the ECU 102-A and the ECU 102-C collects the M1, the M2, and the M3 messages and confirms whether or not the CAN-ID included in the data field of the M1 message is the CAN-ID of the message to be processed by the ECU 102. For example, the control unit 801 of each of the ECU 102-A and the ECU 102-C may confirm whether or not the CAN-ID included in the data field of the M1 message is registered in the CAN communication information 1001 as a processing target. In a case where the CAN-ID included in the data field of the M1 message is not the CAN-ID which is a processing target, the control unit 801 of each of the ECU 102-A and the ECU 102-C may discard the M1, the M2, and the M3 messages. On the other hand, in a case where the CAN-ID included in the data field of the M1 message is the CAN-ID which is a processing target, the control unit 801 of each of the ECU 102-A and the ECU 102-C acquires the M1, the M2, and the M3 messages as processing targets, and the sequence proceeds to S1210.

Note that, in the subsequent processing, for example, the ECU 102-A and the ECU 102-C may execute processing in parallel. Note that a suffix "a" is added to the processing executed by the ECU 102-A and the master ECU 104, and a suffix "c" is added to the processing executed by the ECU 102-C and the master ECU 104. That is, in FIG. 12B, the ECU 102-A and the master ECU 104 execute processing in S1210a to S1216a, and the ECU 102-C and the master ECU 104 execute processing in S1210c to S1216c. These processing corresponds to each other, and in the following, the processing in S1210a to S1216a executed by the ECU 102-A and the master ECU 104 will be described as an example.

In S1210a, the control unit 801 of the ECU 102-A verifies whether or not the counter value included in the M2 message is within a predetermined allowable range from the counter value associated with the CAN-ID included in the M1 message in the CAN communication information 1001. If a difference between the counter values exceeded the allowable range, the control unit 801 of the ECU 102-A may discard the M1, the M2, and the M3 messages. On the other hand, when the difference between the counter values is within the allowable range, the sequence proceeds to S1211a.

In S1211a, the control unit 801 of the ECU 102-A generates a MAC value from the received M1 and M2 messages by the common key and verifies whether nor not the generated MAC value coincides with the MAC value included in the M3 message. When the MAC values are different from each other, the control unit 801 of the ECU 102-A may discard the M1, the M2, and the M3 messages. On the other hand, in a case where the MAC values coincide with each other and the MAC verification has been successfully performed, the sequence proceeds to S1212a.

In S1212a, the control unit 801 of the ECU 102-A decrypts a new encrypted key included in the M2 message by the common key. Then, the control unit 801 of the ECU 102-A stores the acquired new key in the slot indicated by the key slot of the entry including the CAN-ID specified in the data field of the M1 message in the CAN communication information 1001.

In S1213a, the control unit 801 of the ECU 102-A generates an M4 and M5 messages. For example, the control unit 801 of the ECU 102-A acquires a counter value from the entry including the CAN-ID in the data field of the M1 message in the CAN communication information 1001. Then, the control unit 801 of the ECU 102-A generates the M4 message including a UID set to the ECU 102-A, a slot for storing the new key in S1212a, and the acquired counter value in the data field. Furthermore, the control unit 801 of the ECU 102-A generates the M5 message including a MAC value generated from the M4 message by using the common key in the data field.

In S1214a, the control unit 801 of the ECU 102-A transmits the generated M4 and M5 messages to the CAN network. The control unit 701 of the master ECU 104 confirms the CAN-ID of the destination of the message transmitted on the CAN network and collects a message having a CAN-ID of a processing target. For example, the control unit 701 of the master ECU 104 may confirm whether or not the CAN-ID included in the destination of the message is registered in the message processing target information 1102 as a processing target. With this operation, the control unit 701 of the master ECU 104 receives the M4 and the M5 messages transmitted from the ECU 102-A.

Note that, when receiving the M1, the M2, and the M3 messages, the control unit 701 of the master ECU 104 waits for the reception of the M4 and the M5 messages corresponding to those messages. Then, in S1215a, the control unit 701 of the master ECU 104 decrypts the encrypted counter value included in the M4 message by the common key. Subsequently, the control unit 701 of the master ECU 104 verifies whether or not a difference between the counter value corresponding to the CAN-ID specified in the data field of the M1 message in the master CAN communication information 1101 and the counter value decrypted from the M4 message is within a predetermined allowable range. If the difference between the counter values exceeded the allowable range, the control unit 701 of the master ECU 104 may discard the M4 and the M5 messages. On the other hand, when the difference between the counter values is within the allowable range, the sequence proceeds to S1216a.

In S1216a, the control unit 701 of the master ECU 104 generates a MAC value from the M4 message by using the common key and verifies whether or not the generated MAC value coincides with the MAC value in the data field of the M5 message received from the ECU 102-A. In a case where the verification is successfully performed, the control unit 701 of the master ECU 104 can detect that the key distribution of the ECU 102-A is completed.

Note that, in a case where the verification can be performed, the master ECU 104 may update data according to the completion of the key distribution. For example, the control unit 701 of the master ECU 104 stores the generated new key in a key of the entry of the master CAN communication information 1101 including the CAN-ID notified in the data field of the M1 message. Furthermore, for example, in a case where the counter value of the entry of the master CAN communication information 1101 including the CAN-ID notified in the M1 message is different from the counter value notified in the M4 message, the control unit 701 updates the counter value of the entry to the counter value of the M4 message. Furthermore, the control unit 701 of the master ECU 104, for example, specifies the ECU 102 corresponding to the UID notified by the M4 message by using the ECU identification information 1103. Then, for example, in a case where the slot of the entry of the message processing target information 1102 including the CAN-ID notified in the M1 message is different from the slot included in the M4 message, the control unit 701 updates the slot of the entry to the slot included in the M4 message.

Note that, as described above, the processing in S1210a to S1216a respectively corresponds to the processing in S1210c to S1216c, and the control unit 801 of the ECU 102-C and the control unit 701 of the master ECU 104 may similarly complete key exchange according to the processing in S1210c to S1216c.

Furthermore, the flow of the processing of the sequence in FIGS. 12A and 12B described above will be further described with reference to FIGS. 13 to 25 below.

Figure 13:
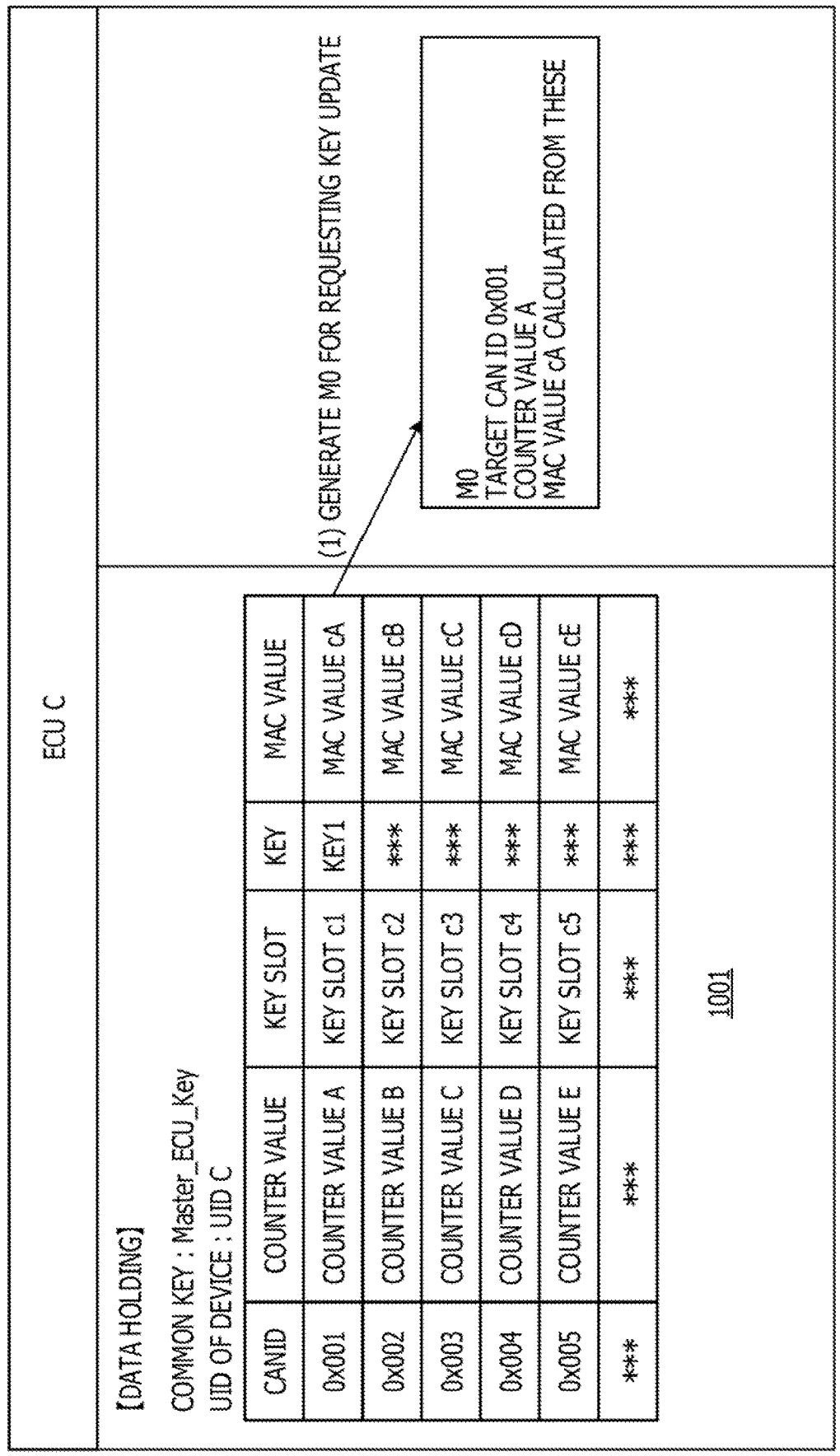
FIG. 13 is a diagram for explaining a flow of the key distribution processing according to the embodiment.

For example, FIG. 13 is a diagram for explaining the processing in S1201 described above, and the storage unit 802 of the ECU 102-C stores the common key (Master_ECU_Key), the UID of the ECU 102-C (UID C), and the CAN communication information 1001. Then, when requesting update of the old key (KEY1), the control unit 801 of the ECU 102-C generates the M0 message ((1) in FIG. 13). The M0 message may include a CAN-ID (0x001) of the message verified by the key to be updated (KEY1), a counter value A associated with the CAN-ID (0x001) in the CAN communication information 1001, and a MAC value cA generated from the CAN-ID and the counter value A.

Figure 14:
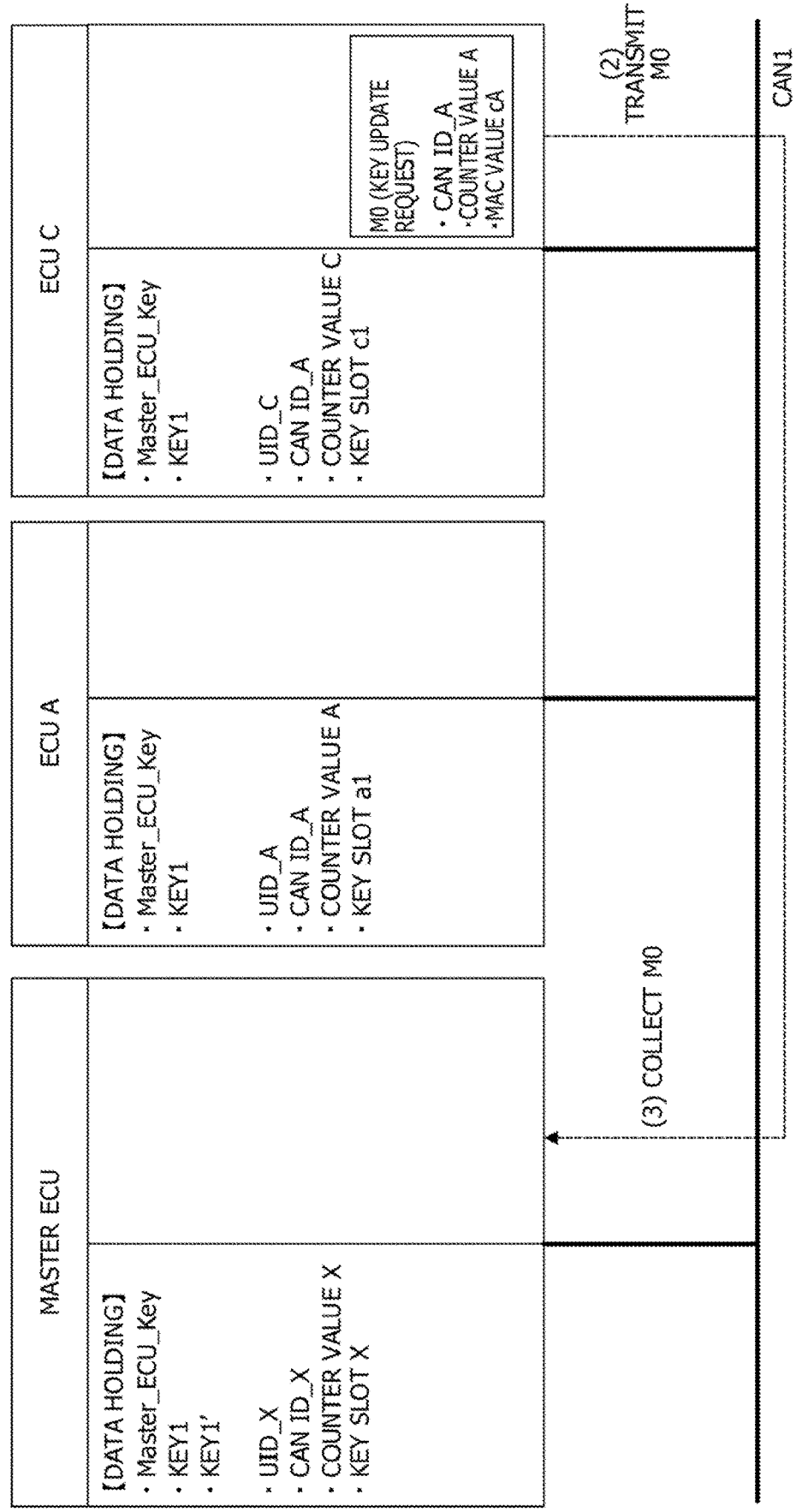
FIG. 14 is a diagram for explaining a flow of the key distribution processing according to the embodiment.

FIG. 14 is, for example, a diagram for explaining the processing in S1202 described above, and the control unit 801 of the ECU 102-C outputs the M0 message to the CAN network ((2) in FIG. 14). On the other hand, the control unit 701 of the master ECU 104 collects the CAN message transmitted on the CAN network and acquires a message having the CAN-ID to be processed by the master ECU 104 as a destination. Here, the control unit 701 of the master ECU 104 may acquire the M0 message output from the ECU 102-C ((3) in FIG. 14).

Figure 15:
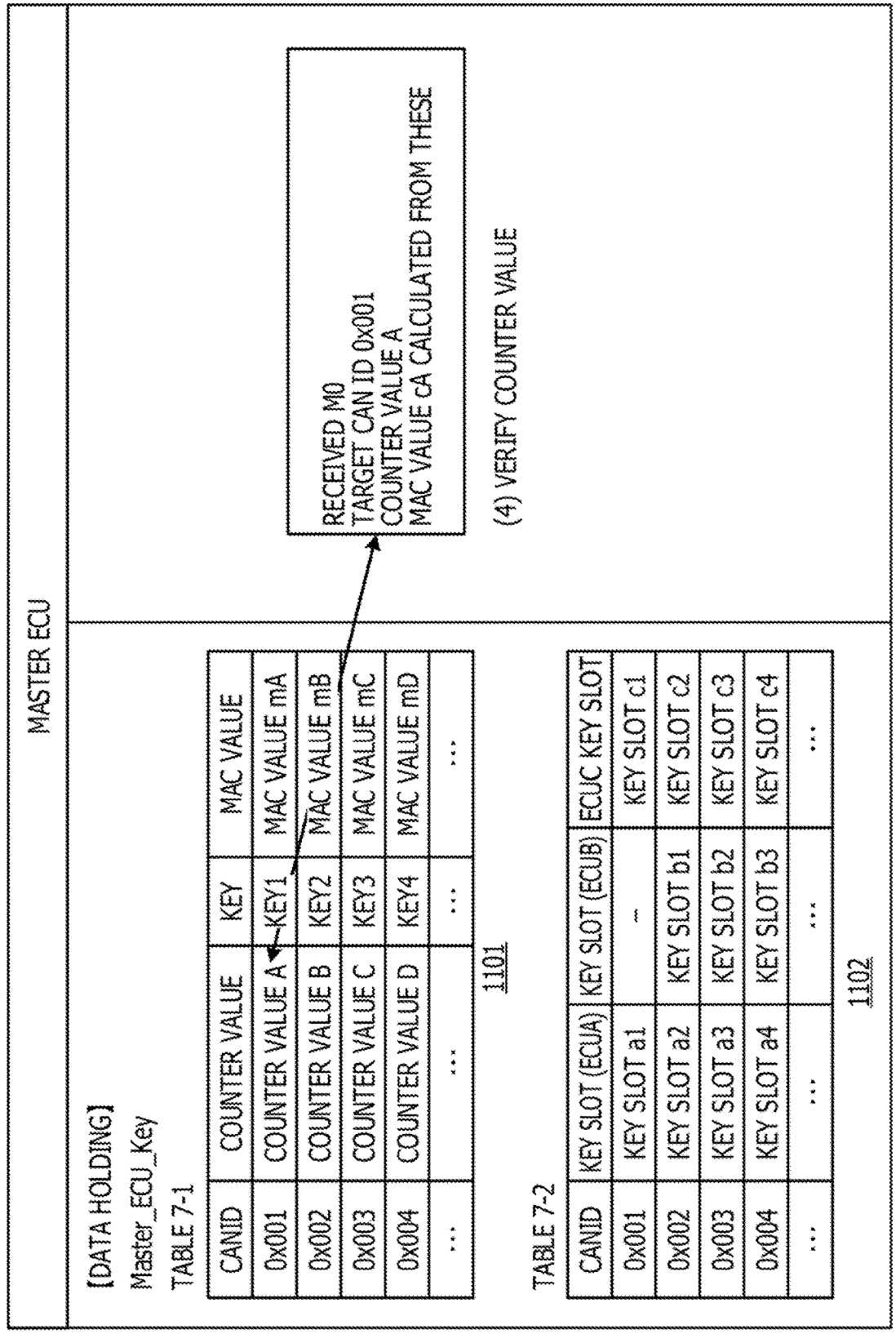
FIG. 15 is a diagram for explaining a flow of the key distribution processing according to the embodiment.

FIG. 15 is, for example, a diagram for explaining the processing in S1203 described above. For example, the control unit 701 verifies whether or not a difference between the counter value of the entry of the master CAN communication information 1101 including the CAN-ID specified in the data field of the M0 message and the counter value included in the M0 message is within a predetermined allowable range ((4) in FIG. 15).

Figure 16:
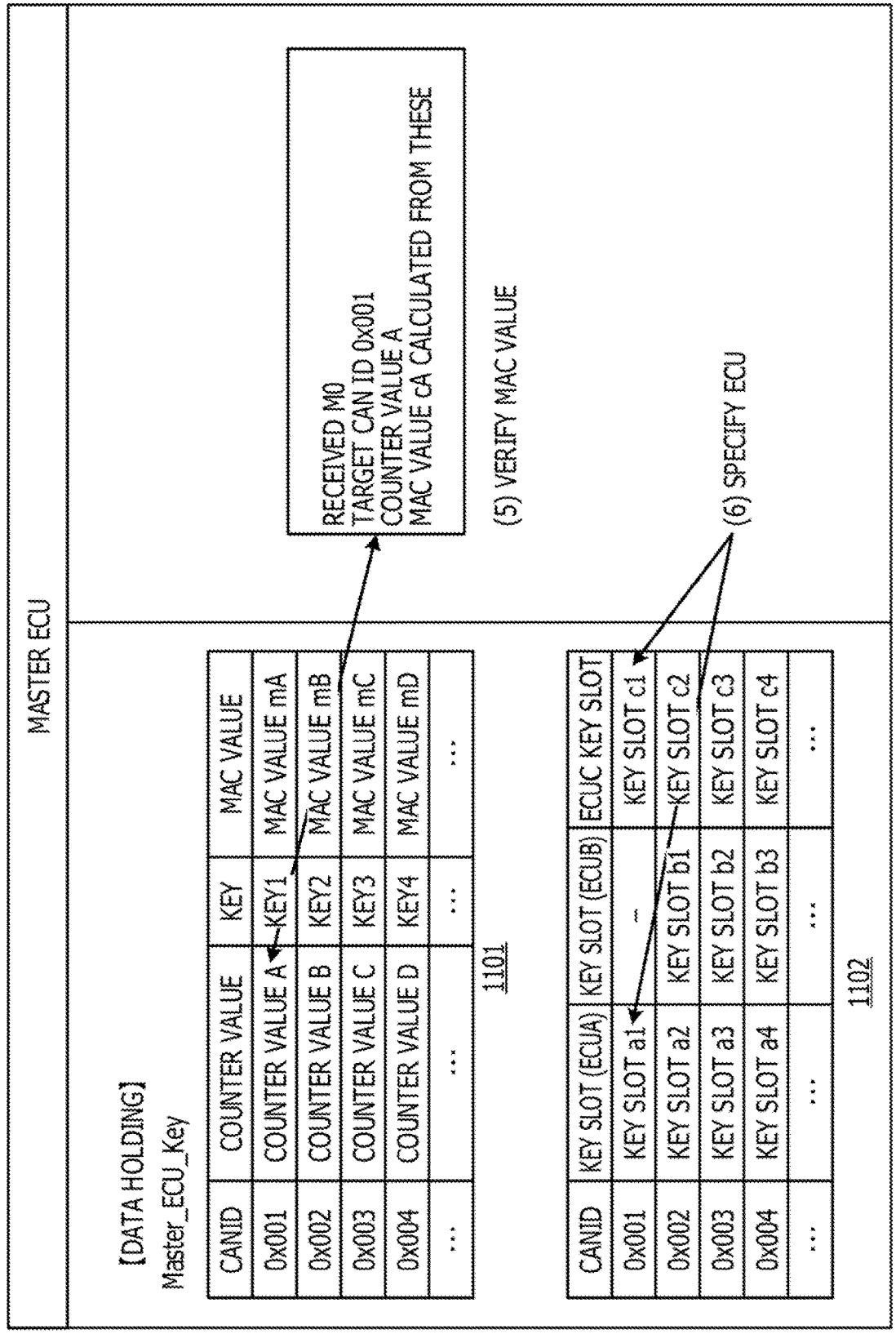
FIG. 16 is a diagram for explaining a flow of the key distribution processing according to the embodiment.

FIG. 16 is, for example, a diagram for explaining the processing in S1204 and S1205 described above. The control unit 701 of the master ECU 104 verifies whether or not the MAC value derived from the CAN-ID of the entry of the master CAN communication information 1101 including the CAN-ID included in the M0 message and the counter value coincides with the MAC value of the M0 message ((5) in FIG. 16). Furthermore, the control unit 701 of the master ECU 104 specifies the ECU 102 that is a key distribution target and exchanges the message with the CAN-ID of which the update of the key is requested by the M0 message from the message processing target information 1102 ((6) in FIG. 16).

Figure 17:
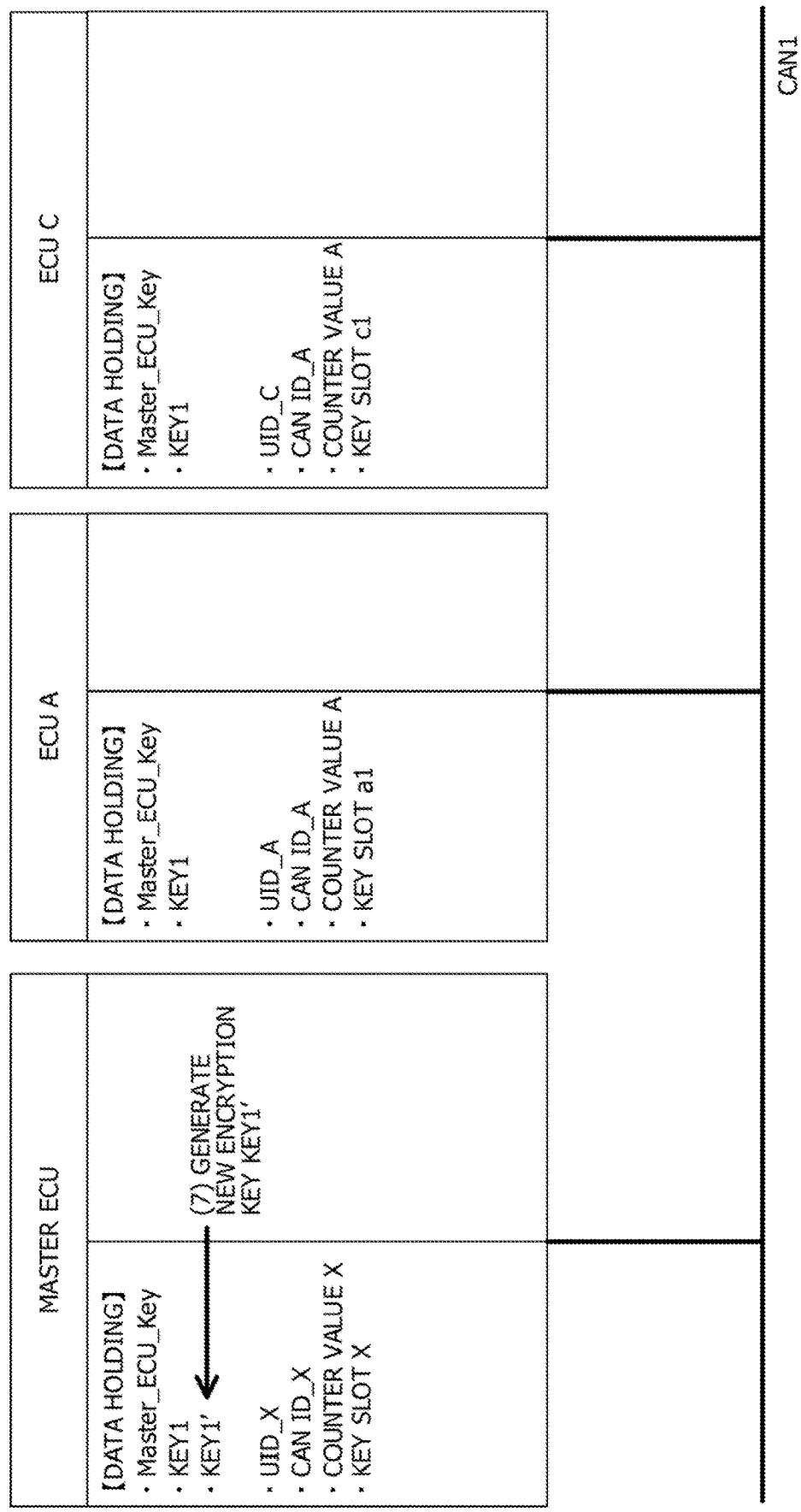
FIG. 17 is a diagram for explaining a flow of the key distribution processing according to the embodiment.

FIG. 17 is, for example, a diagram for explaining the processing in S1206 described above. The control unit 701 of the master ECU 104 generates a new encryption key (KEY1) used to verify the message with the CAN-ID specified in the data field of the M0 message ((7) in FIG. 17).

Figure 18:
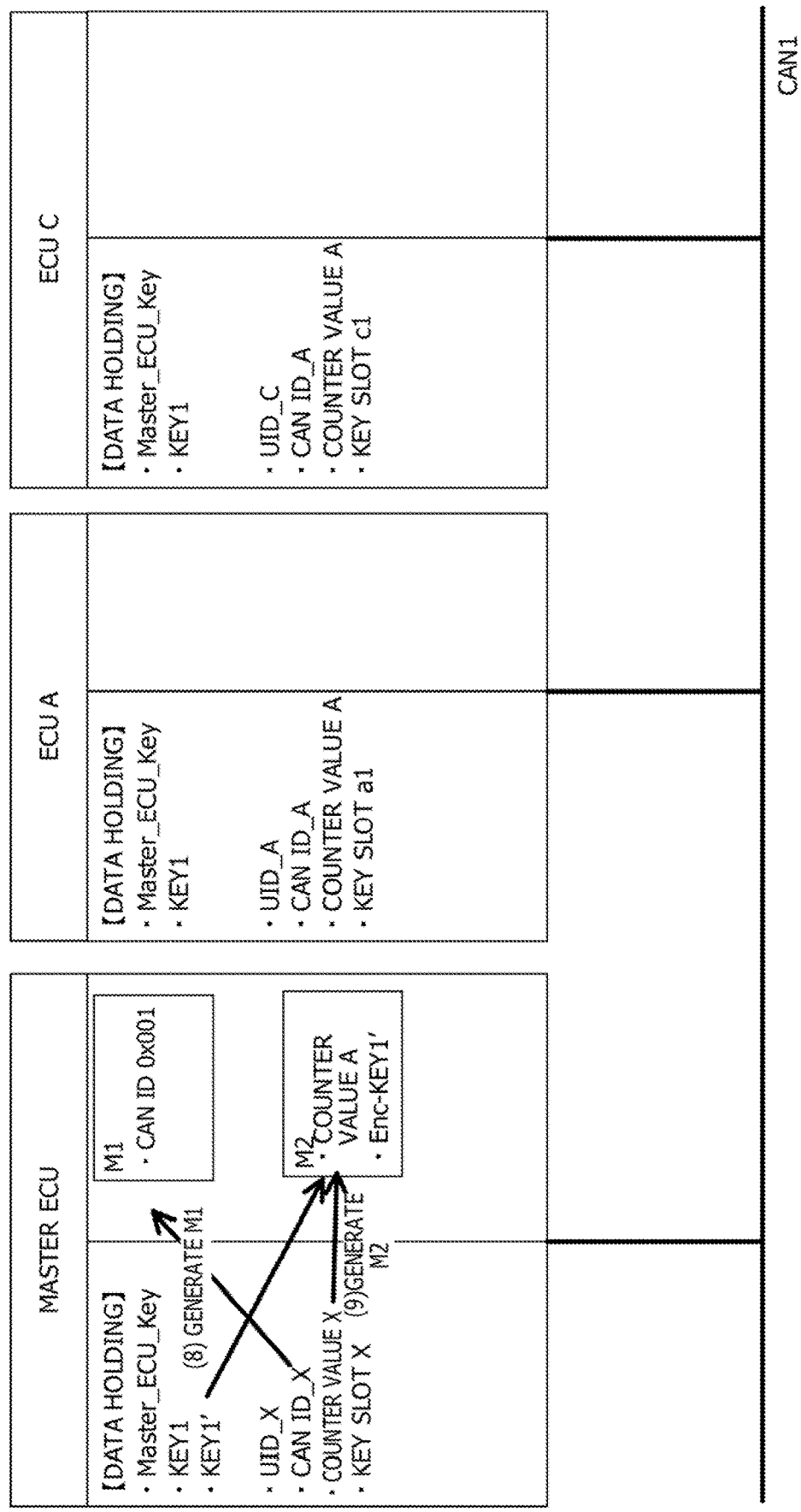
FIG. 18 is a diagram for explaining a flow of the key distribution processing according to the embodiment.

FIG. 18 is, for example, a diagram for explaining the processing in S1207 described above. The control unit 701 of the master ECU 104 generates the M1 message including the key-distribution-target CAN-ID ((8) in FIG. 18). Furthermore, the control unit 701 of the master ECU 104 specifies a counter value corresponding to the key-distribution-target CAN-ID from the master CAN communication information 1101. Furthermore, the control unit 701 of the master ECU 104 encrypts a new key by the common key (Master_ECU_Key) and generates the M2 message including the specified counter value and the new encrypted key ((9) in FIG. 18).

Figure 19:
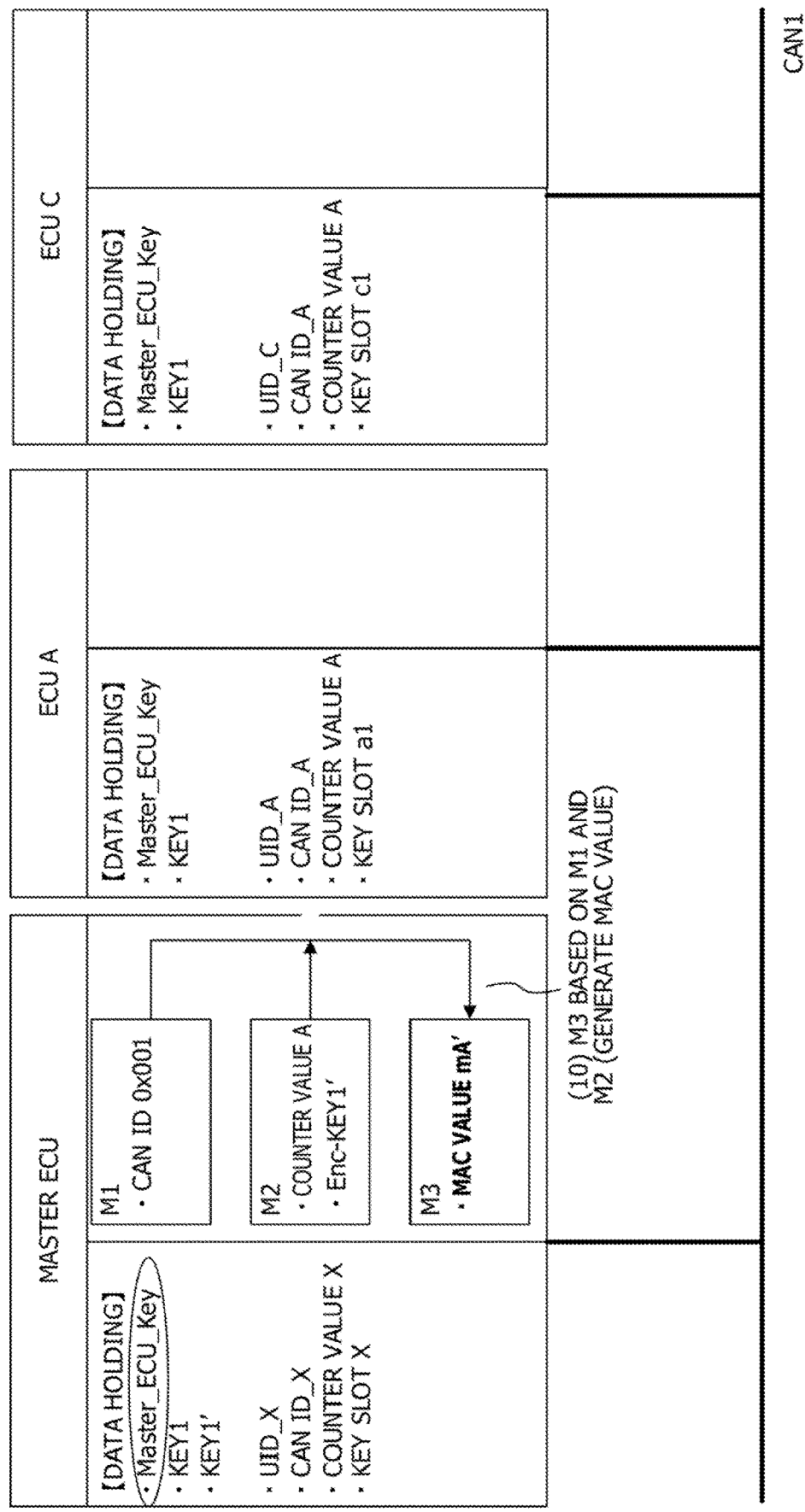
FIG. 19 is a diagram for explaining a flow of the key distribution processing according to the embodiment.

FIG. 19 is, for example, a diagram for explaining the processing in S1208 described above. The control unit 701 of the master ECU 104, for example, generates the M3 message from the M1 and the M2 messages by using the common key ((10) in FIG. 19).

Figure 20:
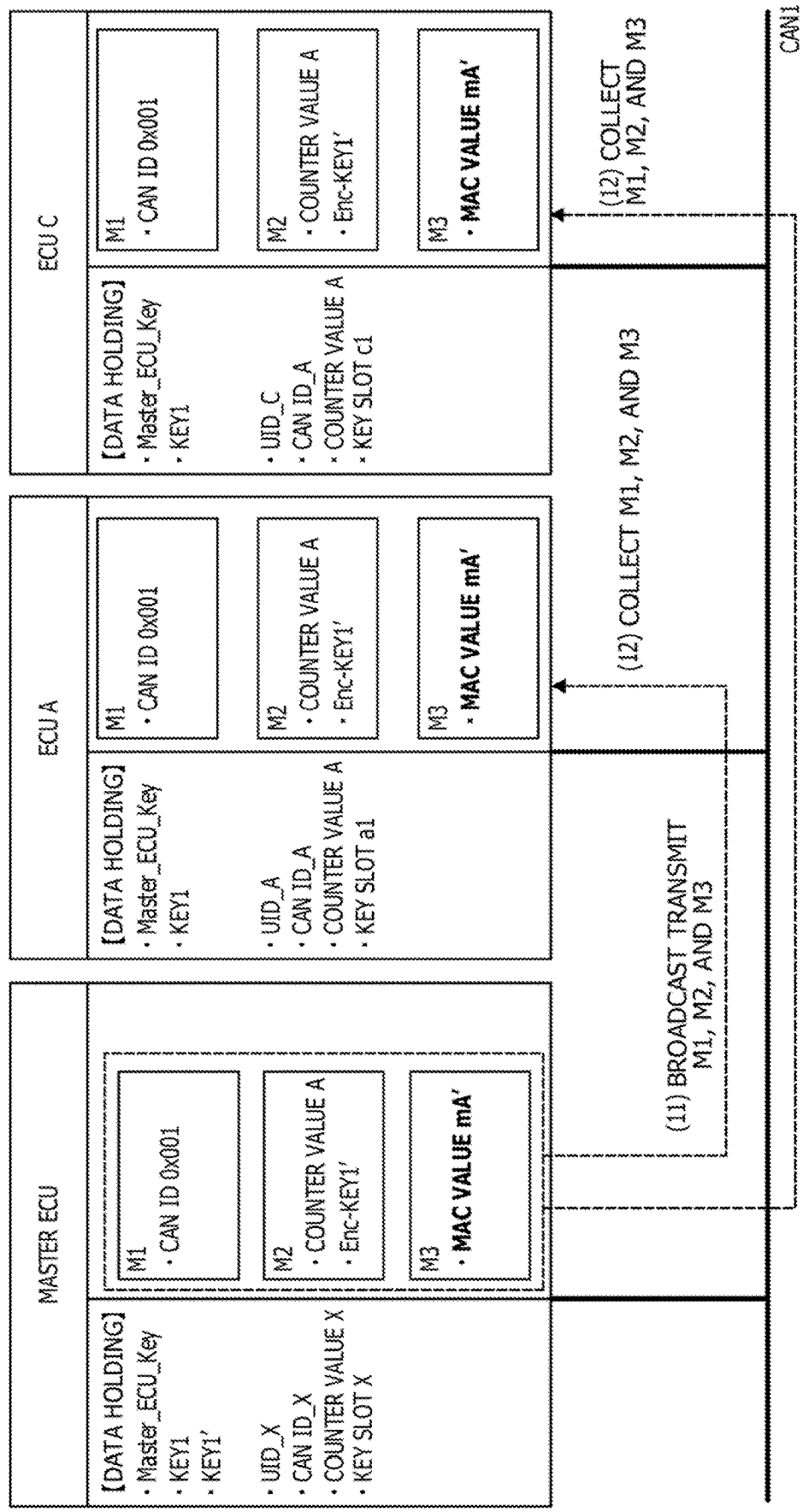
FIG. 20 is a diagram for explaining a flow of the key distribution processing according to the embodiment.

FIG. 20 is, for example, a diagram for explaining the processing in S1209 described above. The control unit 701 of the master ECU 104 broadcasts the generated M1, M2, and M3 messages to the CAN network ((11) in FIG. 20). Then, the M1, the M2, and the M3 messages may be collected as messages to be processed by the ECU 102-A and the ECU 102-C ((12) in FIG. 20). When receiving the M1, the M2, and the M3 messages, the control unit 801 of each of the ECU 102-A and the ECU 102-C determines whether or not the CAN-ID in the data field of the M1 message is a CAN-ID to be processed. Then, in a case where the CAN-ID in the data field is the CAN-ID to be processed, the control unit 801 of the ECU 102 continues the key distribution processing by using the received M1, M2, and M3 messages.

Figure 21:
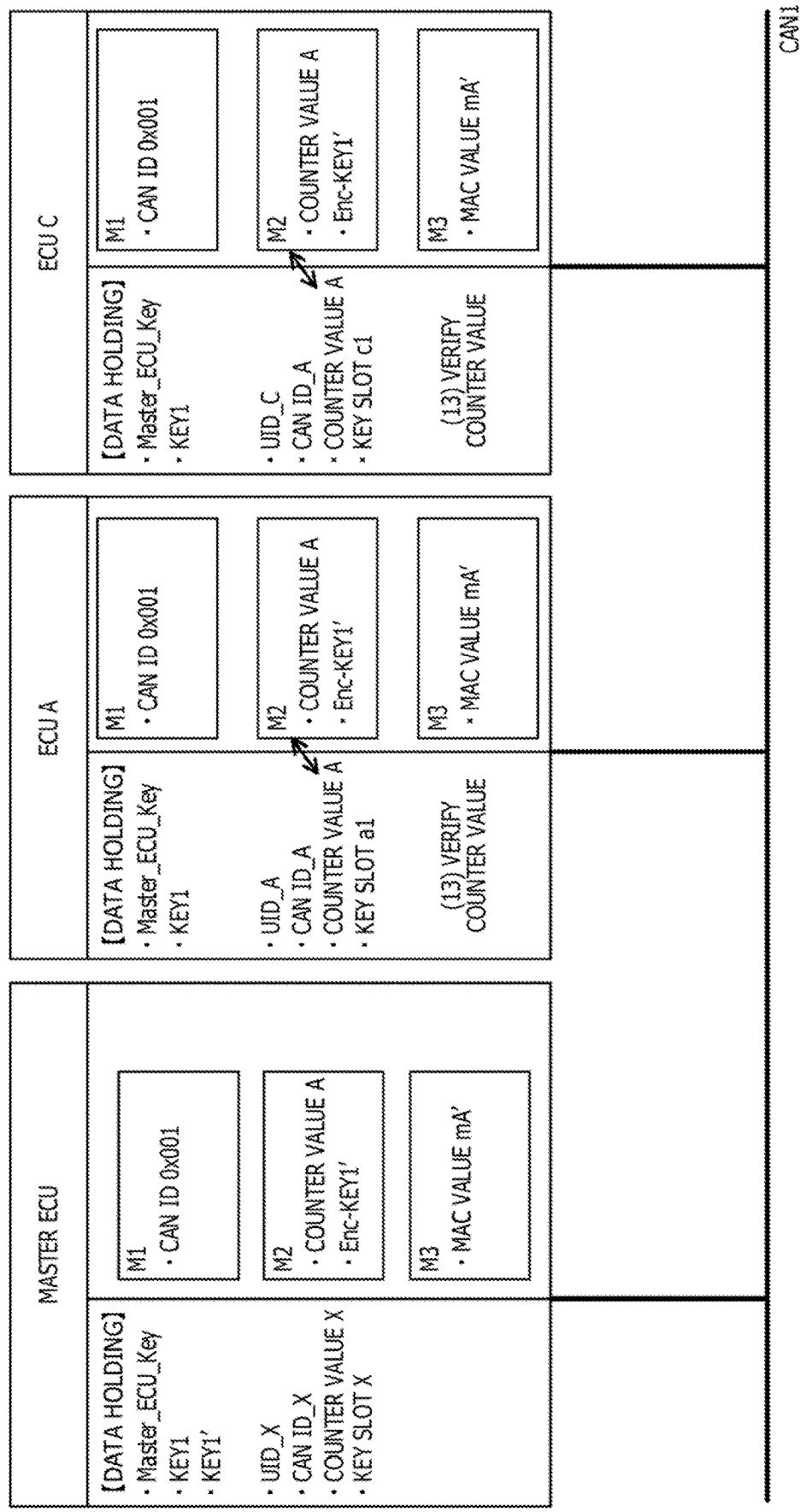
FIG. 21 is a diagram for explaining a flow of the key distribution processing according to the embodiment.

FIG. 21 is, for example, a diagram for explaining the processing in S1210 described above. For example, the control unit 801 of the ECU 102-A compares the counter value included in the M2 message with the counter value of the entry including the CAN-ID of the M1 message in the CAN communication information 1001 so as to verify the counter value ((13) in FIG. 21). Furthermore, similarly, the control unit 801 of the ECU 102-C may also verify the counter value ((13) in FIG. 21).

Figure 22:
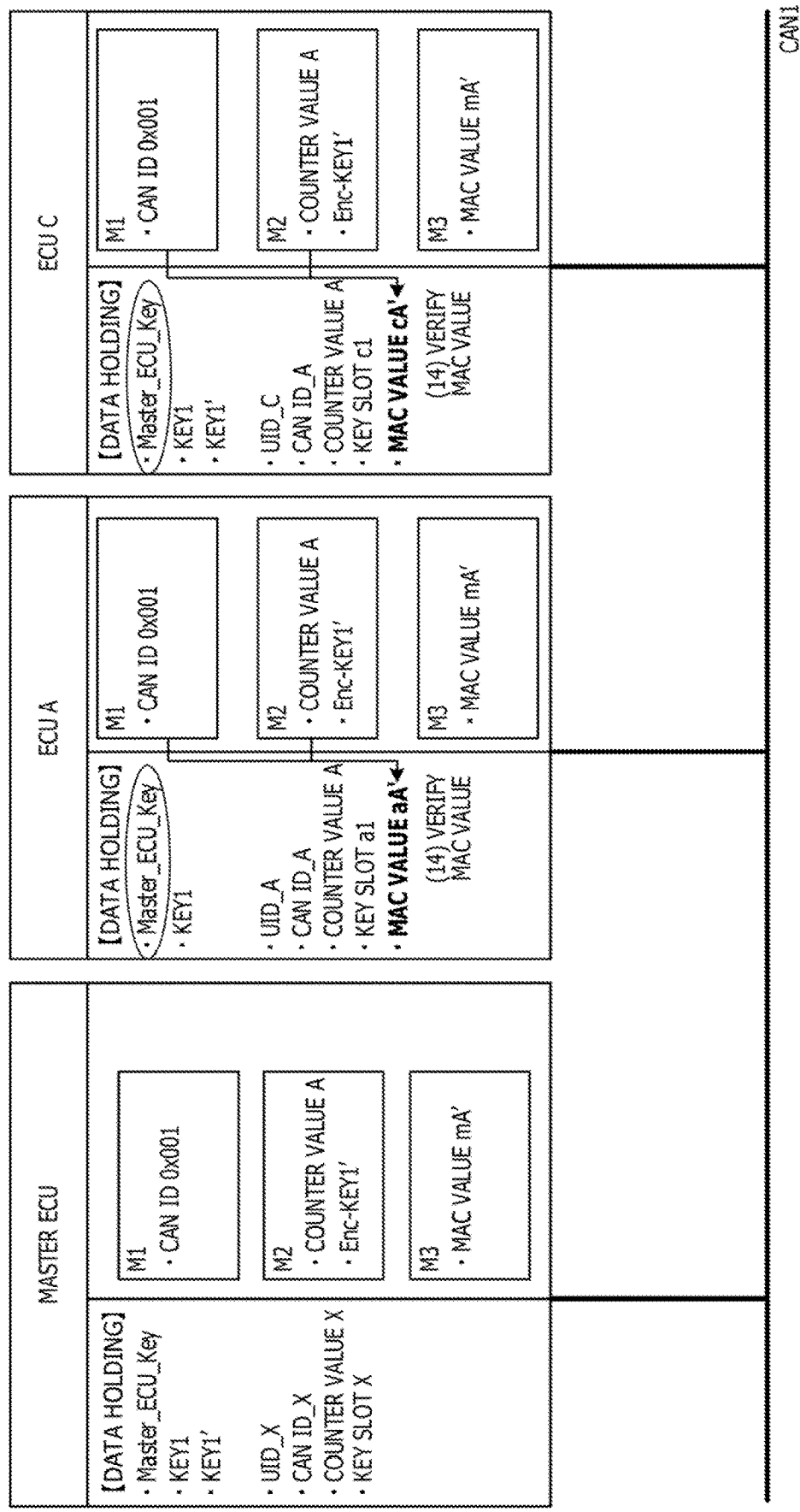
FIG. 22 is a diagram for explaining a flow of the key distribution processing according to the embodiment.

FIG. 22 is, for example, a diagram for explaining the processing in S1211 described above. For example, the control unit 801 of the ECU 102-A generates the MAC value from the received M1 and M2 messages by the common key (Master_ECU_Key) and verifies whether or not the generated MAC value coincides with the MAC value included in the M3 message ((14) in FIG. 22). Furthermore, similarly, the control unit 801 of the ECU 102-C may verify the MAC value ((14) in FIG. 22).

Figure 23:
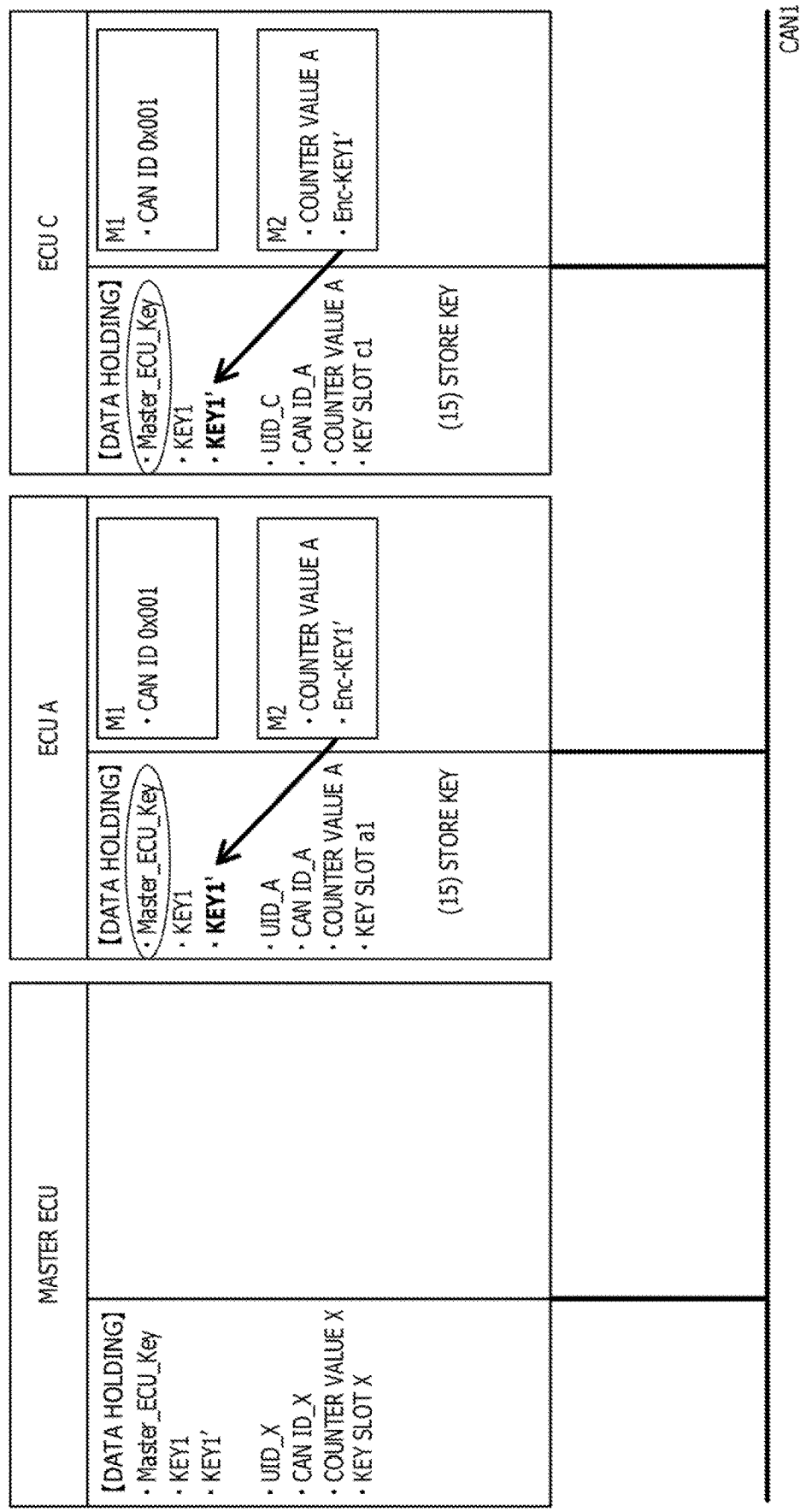
FIG. 23 is a diagram for explaining a flow of the key distribution processing according to the embodiment.

FIG. 23 is, for example, a diagram for explaining the processing in S1212 described above. For example, the control unit 801 of the ECU 102-A decrypts the encrypted new key included in the M2 message by the common key (Master_ECU_Key). Then, the control unit 801 of the ECU 102-A stores the acquired new key in the key slot of the entry identified by the CAN-ID specified in the data field of the M1 message in the CAN communication information 1001 ((15) in FIG. 23). Furthermore, similarly, the control unit 801 of the ECU 102-C may store the new key in the slot ((15) in FIG. 23).

Figure 24A:
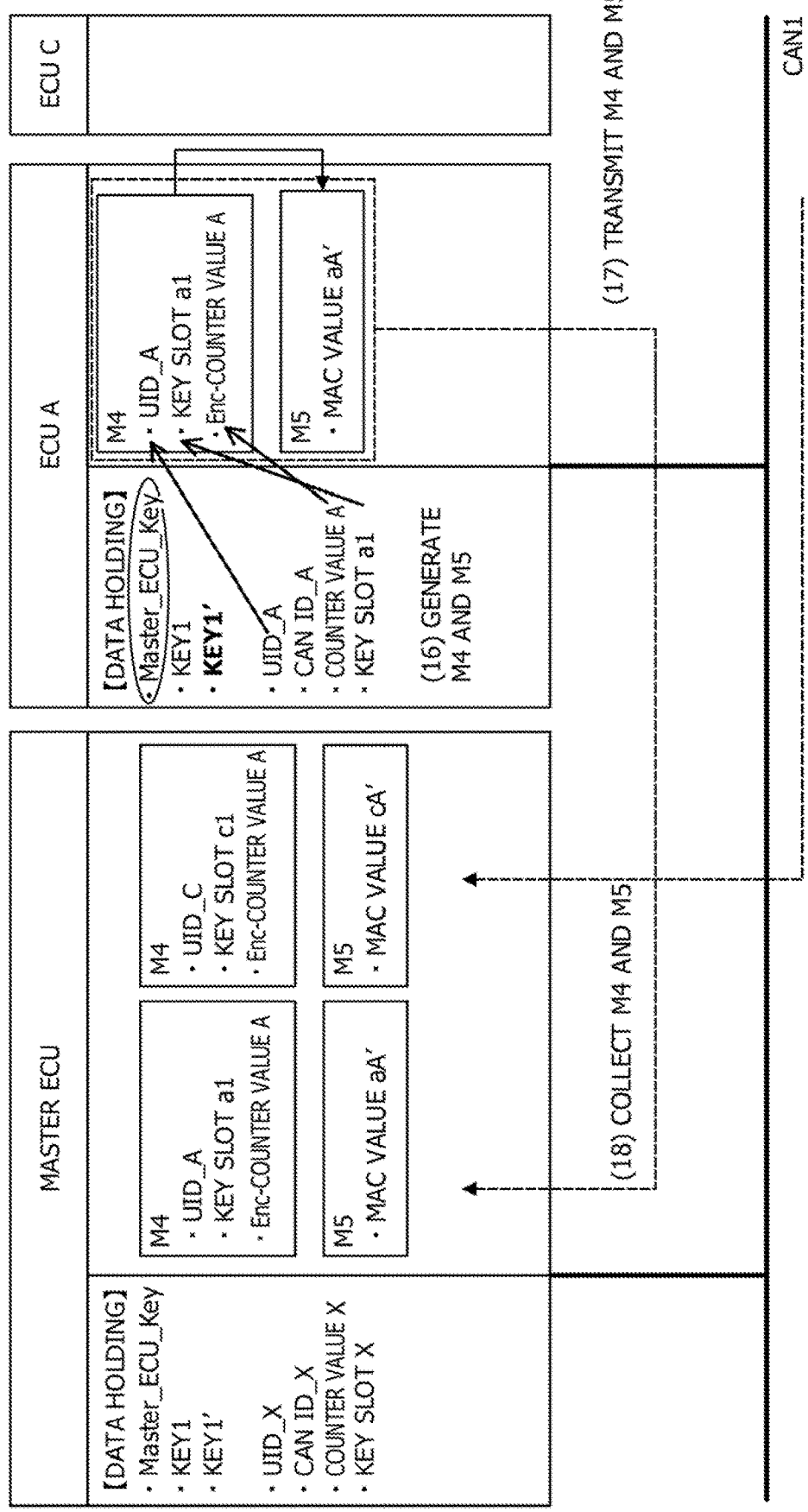

FIGS. 24A and 24B are, for example, diagrams for explaining the processing in S1213 and S1214 described above. For example, the control unit 801 of the ECU 102-A generates the M4 and the M5 messages. The control unit 801 of the ECU 102-A, for example, acquires the counter value of the entry identified by the CAN-ID specified in the data field of the M1 message from the CAN communication information 1001. Then, the control unit 801 of the ECU 102-A generates the M4 message including the UID stored in the storage unit 802 of the ECU 102-A, the slot where the new key is stored, and the acquired counter value in the data field. Furthermore, the control unit 801 of the ECU 102-A generates the M5 message including the MAC value generated from the M4 message by using the common key (Master_ECU_Key) in the data field ((16) in FIG. 24A). Note that, similarly, the control unit 801 of the ECU 102-C may also generate the M4 and the M5 messages ((16) in FIG. 24A).

Then, the control unit 801 of each of the ECU 102-A and the ECU 102-C transmits the generated M4 and M5 messages to the CAN network ((17) in FIG. 24A). The control unit 701 of the master ECU 104 confirms the CAN-ID of the destination of the message transmitted on the CAN network and collects a message having a CAN-ID of a processing target. Accordingly, the control unit 701 of the master ECU 104 collects the M4 and the M5 messages as messages to be processed ((18) in FIG. 24A).

Figure 25A:
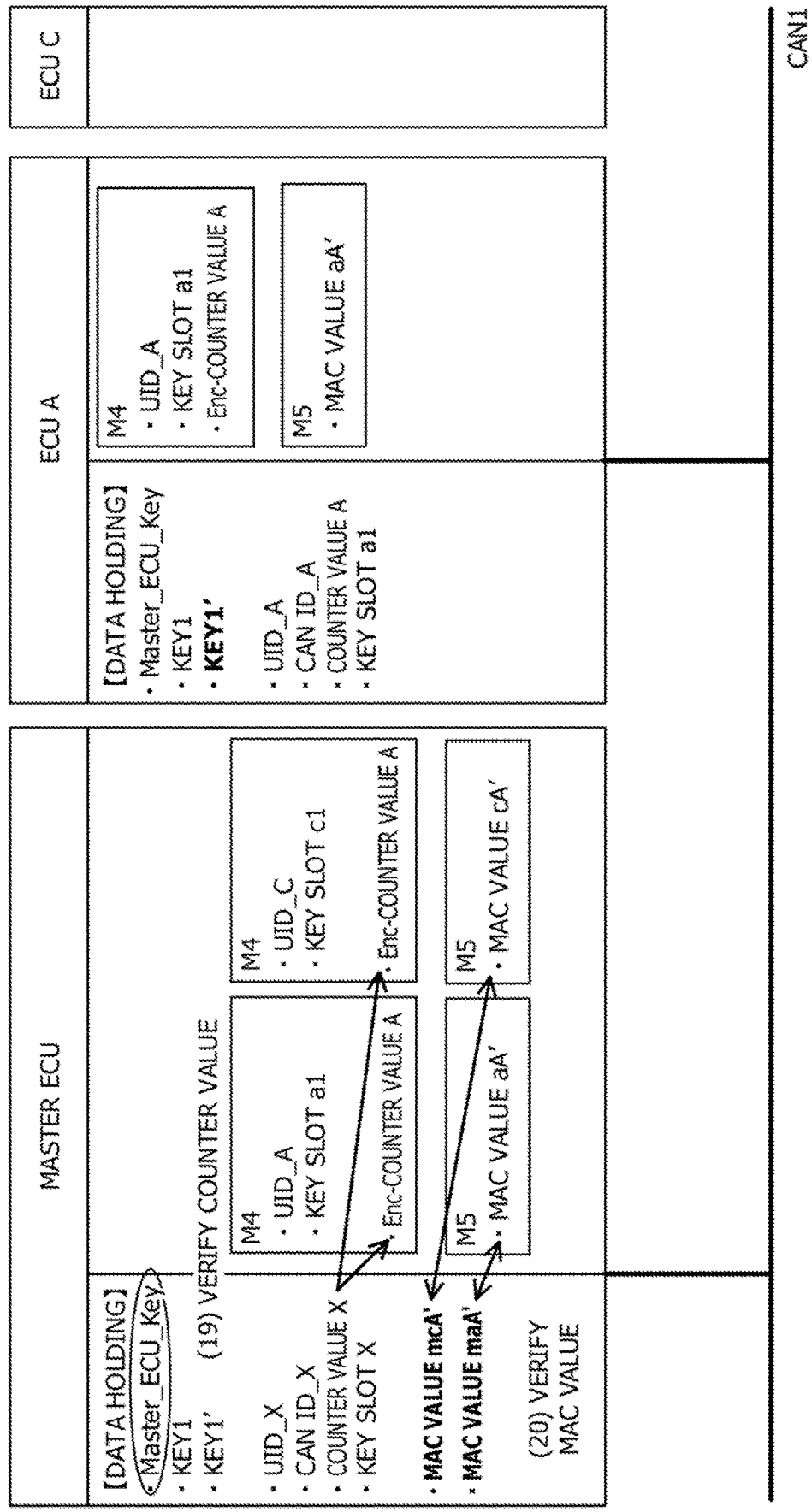
FIGS. 25A and 25B are diagrams for explaining a flow of the key distribution processing according to the embodiment.
Figure 25B:
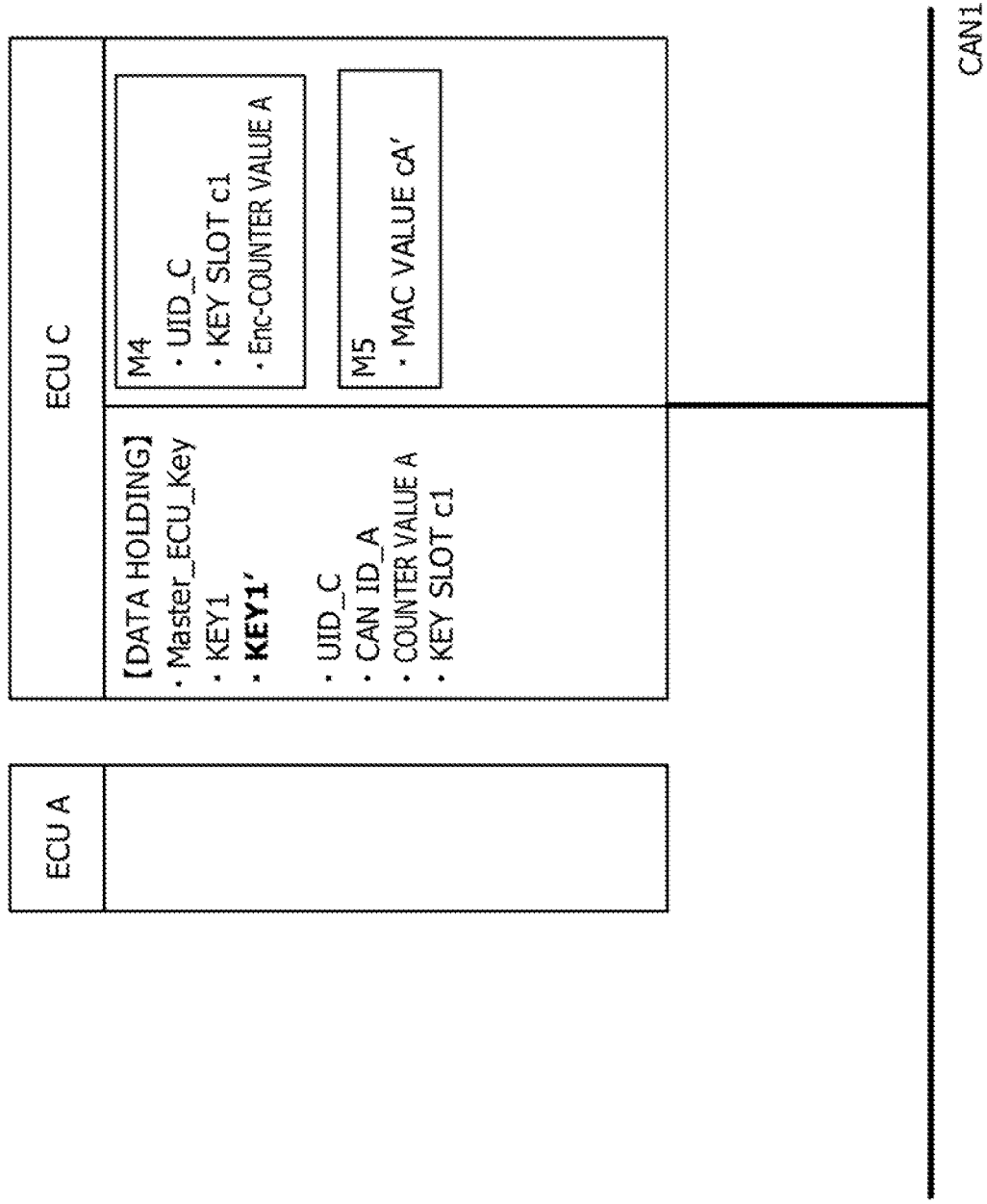

FIGS. 25A and 25B are, for example, diagrams for explaining the processing in S1215 and S1216 described above. The control unit 701 of the master ECU 104 decrypts the encrypted counter value included in the M4 message by the common key. Then, the control unit 701 verifies the counter value by using the counter value associated with the CAN-ID specified in the data field of the M1 message in the master CAN communication information 1101 and the counter value decrypted from the M4 message ((19) in FIG. 25A). Note that, similarly, the control unit 801 of the ECU 102-C may also verify the counter value ((19) in FIG. 25A).

Subsequently, the control unit 701 of the master ECU 104 generates the MAC value from the M4 messages respectively received from the ECU 102-A and the ECU 102-C by using the common key. Then, the control unit 701 of the master ECU 104 compares the MAC value generated from the M4 message received from the ECU 102-A with the MAC value of the M5 message received from the ECU 102-A and verifies the M4 message ((20) in FIG. 25A). Furthermore, similarly, the control unit 701 of the master ECU 104 compares the MAC value generated from the M4 message received from the ECU 102-C with the MAC value of the M5 message received from the ECU 102-C and verifies the M4 message ((20) in FIG. 25A). Note that, since the M4 message includes a UID of an ECU 102 which is a transmission source, the control unit 701 of the master ECU 104 can specify the transmission source of the message from the UID. For example, according to the above processing, the control unit 701 of the master ECU 104 can detect the completion of the key update processing.

In a case where the control unit 701 of the master ECU 104 detects the completion of the key update processing, the control unit 701 may update data according to the completion of the key distribution. For example, the control unit 701 of the master ECU 104 stores the new key generated in S1206 in the key of the entry of the master CAN communication information 1101 including the CAN-ID notified in the M1 message. Furthermore, for example, in a case where the counter value notified in the M4 message is different from the counter value of the entry in the master CAN communication information 1101 including the CAN-ID notified in the M1 message, the control unit 701 may update the counter value to the counter value notified in the M4 message. Furthermore, the control unit 701 of the master ECU 104, for example, specifies the ECU 102 corresponding to the UID notified by the M4 message by using the ECU identification information 1103. Then, for example, the control unit 701 confirms whether or not the slot of the ECU 102 specified from the UID of the M4 message of the entry in the message processing target information 1102 including the CAN-ID notified in the M1 message is different from the slot notified in the M4 message. Then, in a case where the slots are different from each other, the control unit 701 updates the slot of the ECU 102 specified from the UID of the M4 message to a value of the slot of the M4 message, in the entry of the message processing target information 1102 including the CAN-ID notified in the M1 message.

Figure 26:
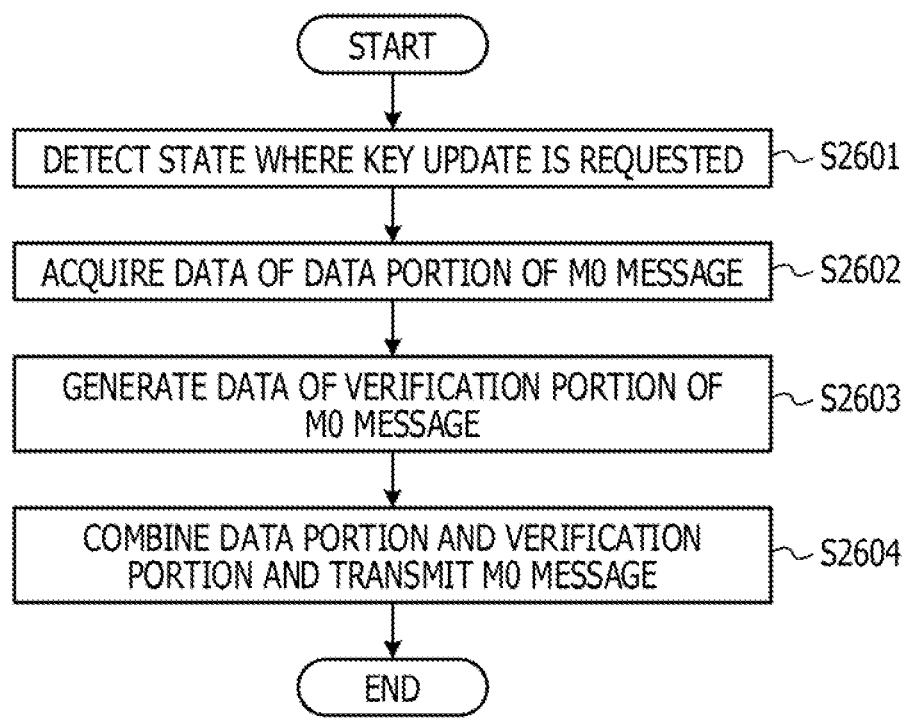
FIG. 26 is a diagram illustrating M0 message transmission processing executed by a control unit of the ECU according to the embodiment.

Furthermore, FIGS. 26 to 29 are diagrams illustrating an operation flow of the key distribution processing described above. FIG. 26 is a diagram illustrating M0 message transmission processing executed by the control unit 801 of the ECU 102. For example, when activated, the control unit 801 of the ECU 102 may start the processing in FIG. 26.

In S2601, the control unit 801 of the ECU 102 detects a state where the key distribution is requested. For example, in a case where attacks more than allowable number of times are received and in a case where leakage of the counter value and the key is detected, the control unit 801 of the ECU 102 may detect that the key distribution is required in this state.

In S2602, the control unit 801 of the ECU 102 acquires data of a data portion of the M0 message. For example, the control unit 801 of the ECU 102 acquires information regarding a CAN-ID of a message encrypted by a key distribution target encryption key and a counter value corresponding to the CAN-ID as the data of the data portion from the CAN communication information 1001.

In S2603, the control unit 801 of the ECU 102 generates data of a verification portion of the M0 message. For example, the control unit 801 of the ECU 102 may generate a MAC value from the CAN-ID and the counter value acquired as the data of the data portion by using the common key and use the generated MAC value as the data of the verification portion.

In S2604, the control unit 801 of the ECU 102 combines the data of the data portion of the M0 message and the data of the verification portion and stores the combined data in the data field of the M0 message, and transmits the M0 message to the CAN network, and this operation flow is terminated.

As described above, according to the operation flow in FIG. 26, the M0 message that requests to distribute the encryption key used for verification of the message specified by the CAN-ID is transmitted from the ECU 102 to the CAN network.

Figure 27:
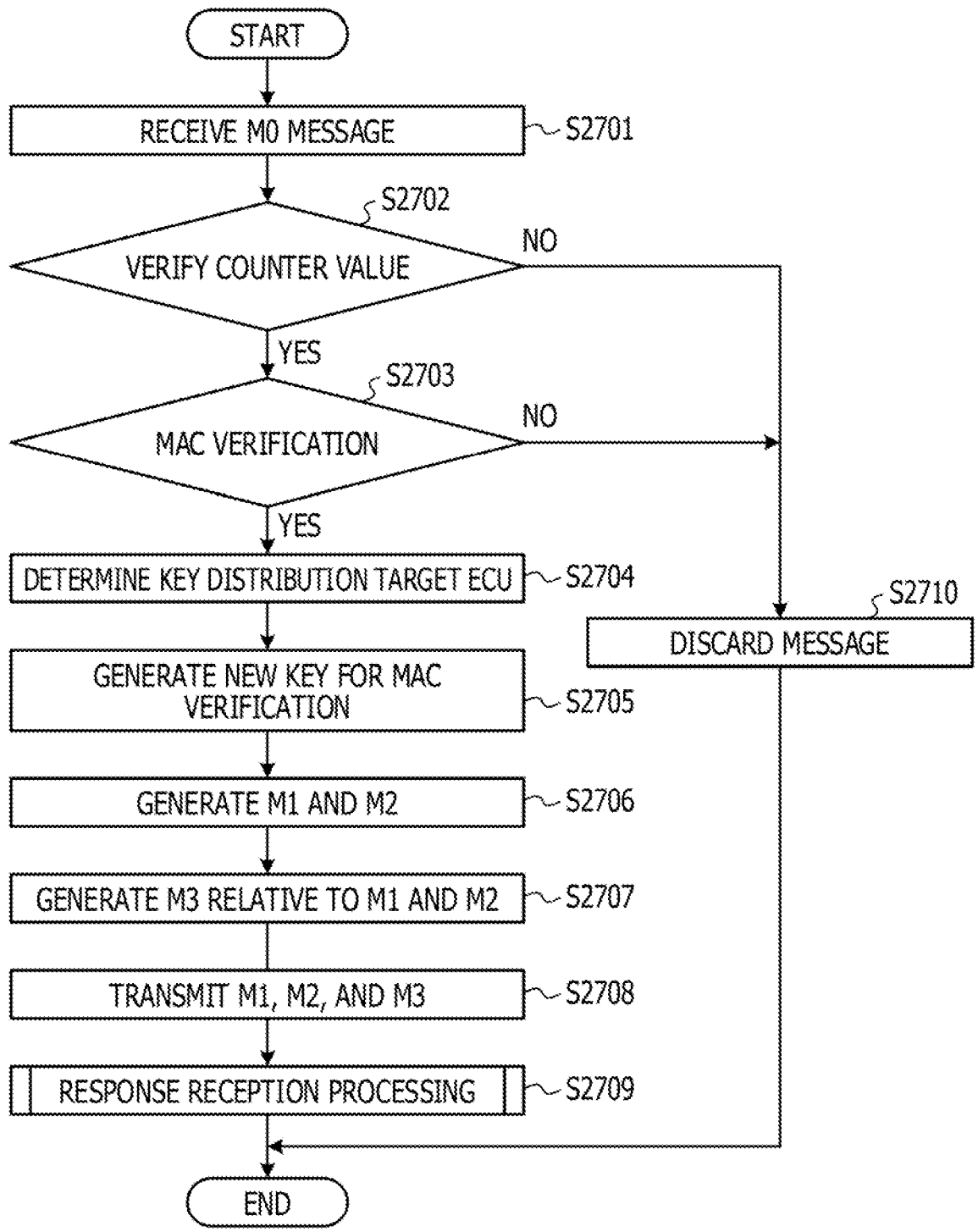
FIG. 27 is a diagram illustrating updated key notification processing executed by a control unit of the master ECU according to the embodiment.

FIG. 27 is a diagram illustrating updated key notification processing executed by the control unit 701 of the master ECU 104. For example, when activated, the control unit 701 of the master ECU 104 may start the processing in FIG. 27.

In S2701, the control unit 701 of the master ECU 104 confirms the CAN-ID of the destination of the message transmitted on the CAN network and collects a message having a CAN-ID of a processing target. Accordingly, the control unit 701 of the master ECU 104 receives the M0 message as a message to be processed. In S2702, the control unit 701 of the master ECU 104 compares the counter value included in the data field of the M0 message with the counter value of the entry in the master CAN communication information 1101 including the CAN-ID included in the data field of the M0 message. Then, the control unit 701 of the master ECU 104 verifies whether or not a difference between the counter values is within a predetermined allowable range. In a case where the counter values are successfully verified (YES in S2702), the flow proceeds to S2703.

In S2703, the control unit 701 verifies whether or not the MAC value derived from the CAN-ID and the counter value of the entry in the master CAN communication information 1101 including the CAN-ID included in the data field of the M0 message coincides with the MAC value included in the M0 message. In a case where the MAC values are successfully verified (YES in S2703), the flow proceeds to S2704.

Note that, in a case where the counter values are different from each other in S2702 (NO in S2702) and in a case where the MAC values are different from each other in S2703 (NO in S2703), the flow proceeds to S2710. In S2710, the control unit 701 of the master ECU 104 discards the received M0 message, and this operation flow is terminated.

In S2704, the control unit 701 of the master ECU 104 may refer to the entry in the message processing target information 1102 including the CAN-ID included in the M0 message and specify the ECU 102 in which the key slot is registered as a key distribution target ECU 102.

In S2705, the control unit 701 of the master ECU 104 generates a new key for verification. In S2706, the control unit 701 of the master ECU 104 generates an M1 and M2 messages. For example, the control unit 701 may generate the M1 message including a key-distribution-target CAN-ID notified in the M0 message in the data field. Furthermore, the control unit 701 generates the M2 message including a new key obtained by encrypting the new key generated in S2705 by the common key and a counter value associated with the key-distribution-target CAN-ID in the master CAN communication information 1101 in the data field.

In S2707, the control unit 701 of the master ECU 104 acquires MAC values with respect to the M1 and the M2 messages by using the common key and generates an M3 message including the acquired MAC values in the data field.

In S2708, the control unit 701 of the master ECU 104 transmits the generated M1, M2, and M3 messages to the CAN network and waits for reception of an M4 and M5 messages that are responses to the transmitted M1, M2, and M3 messages.

Figure 28:
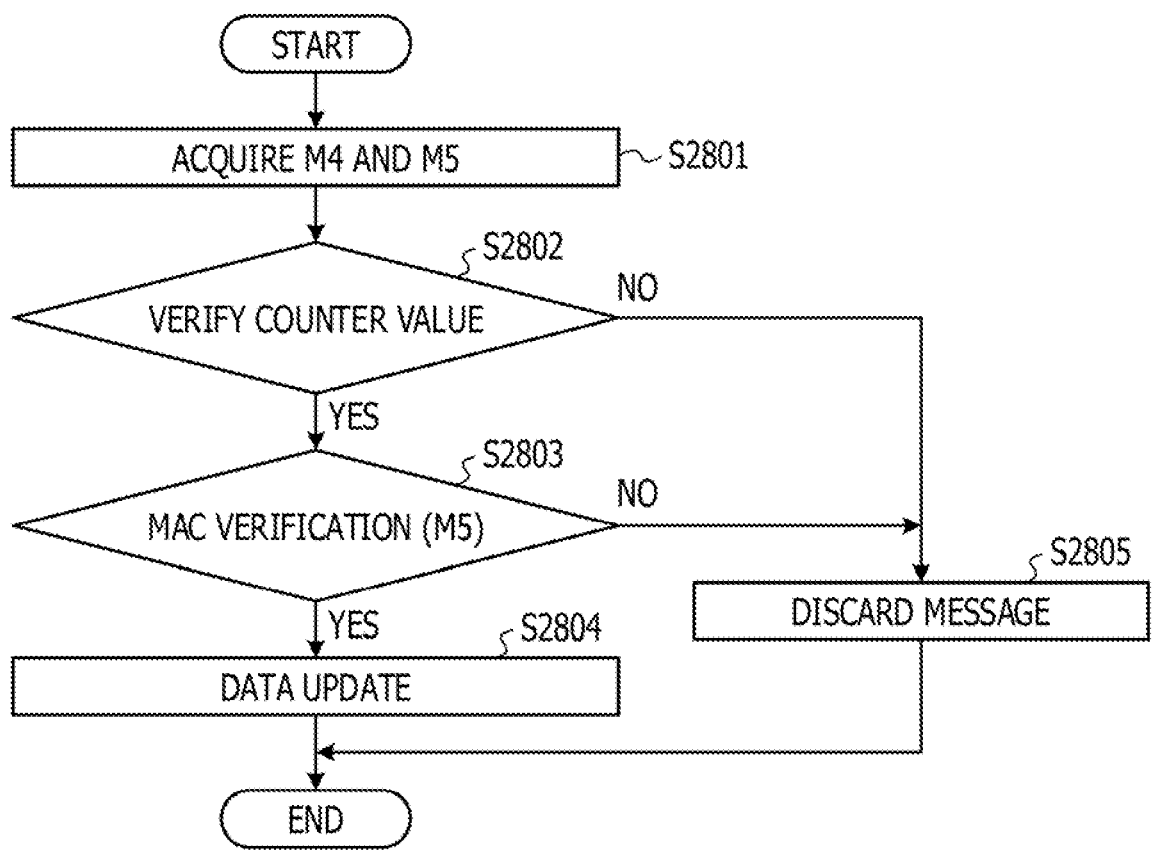
FIG. 28 is a diagram illustrating response reception processing executed by the control unit of the master ECU according to the embodiment.

In S2709, the control unit 701 of the master ECU 104 executes response reception processing for receiving and verifying the M4 and the M5 messages that are the responses to the transmitted M1, M2, and M3 messages. FIG. 28 is a diagram illustrating the response reception processing executed in S2709.

In S2801, the control unit 701 of the master ECU 104 confirms the CAN-ID of the destination of the message transmitted on the CAN network and collects a message having a CAN-ID of a processing target. With this operation, the control unit 701 of the master ECU 104 receives the M4 and the M5 messages that are responses to the M1, M2, and M3 messages transmitted in S2708 from the ECU 102.

In S2802, the control unit 701 of the master ECU 104 decrypts the encrypted counter value included in the M4 message by the common key. Then, the control unit 701 of the master ECU 104 verifies whether or not a difference between the decrypted counter value and the counter value acquired from the entry in the master CAN communication information 1101 including the CAN-ID of the M1 message transmitted in S2708 is within a predetermined allowable range. In a case where the difference between the counter values is within the predetermined allowable range (YES in S2802), the flow proceeds to S2803.

In S2803, the control unit 701 of the master ECU 104 generates a MAC value from the M4 message by using the common key. Then, for example, the control unit 701 of the master ECU 104 compares the generated MAC value with the MAC value of the M5 message received from the ECU 102 and verifies the M4 message. In a case where the verification is successfully performed (YES in S2803), the control unit 701 of the master ECU 104 can determine that the key distribution of the ECU 102 identified by the UID included in the data field of the M4 message has been completed, and the flow proceeds to S2804.

In S2804, the control unit 701 of the master ECU 104 updates data according to the completion of the key distribution. For example, the control unit 701 of the master ECU 104 stores the new key generated in S2705 in the key of the entry of the master CAN communication information 1101 including the CAN-ID notified in the M1 message. Furthermore, in a case where the counter value notified in the M4 message is different from the counter value of the entry in the master CAN communication information 1101 including the CAN-ID notified in the M1 message, the control unit 701 updates the counter value of the entry to the counter value notified in the M4 message. The control unit 701, for example, specifies the ECU 102 corresponding to the UID notified by the M4 message by using the ECU identification information 1103. Then, the control unit 701 confirms whether or not the slot of the ECU 102 specified from the UID of the M4 message included in the entry in the message processing target information 1102 including the CAN-ID notified in the M1 message is different from the slot notified in the M4 message. Then, in a case where the slots are different from each other, the control unit 701 updates the slot of the ECU 102 specified from the UID of the M4 message included in the entry in the message processing target information 1102 to the value of the slot notified in the M4 message, and this operation flow is terminated. Note that, in S2804, the control unit 701 of the master ECU 104 may store a log regarding the completion of the key distribution, for example, information regarding the UID of the ECU 102 which has completed the key distribution.

Furthermore, in a case where the counter values are different from each other in S2802 (NO in S2802) and in a case where the MAC values are different from each other in S2803 (NO in S2803), the flow proceeds to S2805. In S2805, the control unit 701 of the master ECU 104 discards the received M4 and M5 messages, and this operation flow is terminated. When the operation flow in FIG. 28 is terminated, the processing in S2709 in the flow is completed, and the operation flow in FIG. 27 is terminated.

Note that the response reception processing in FIG. 28 may be executed with all the ECUs 102 that process a message identified by the CAN-ID notified in the M1 message.

Figure 29:
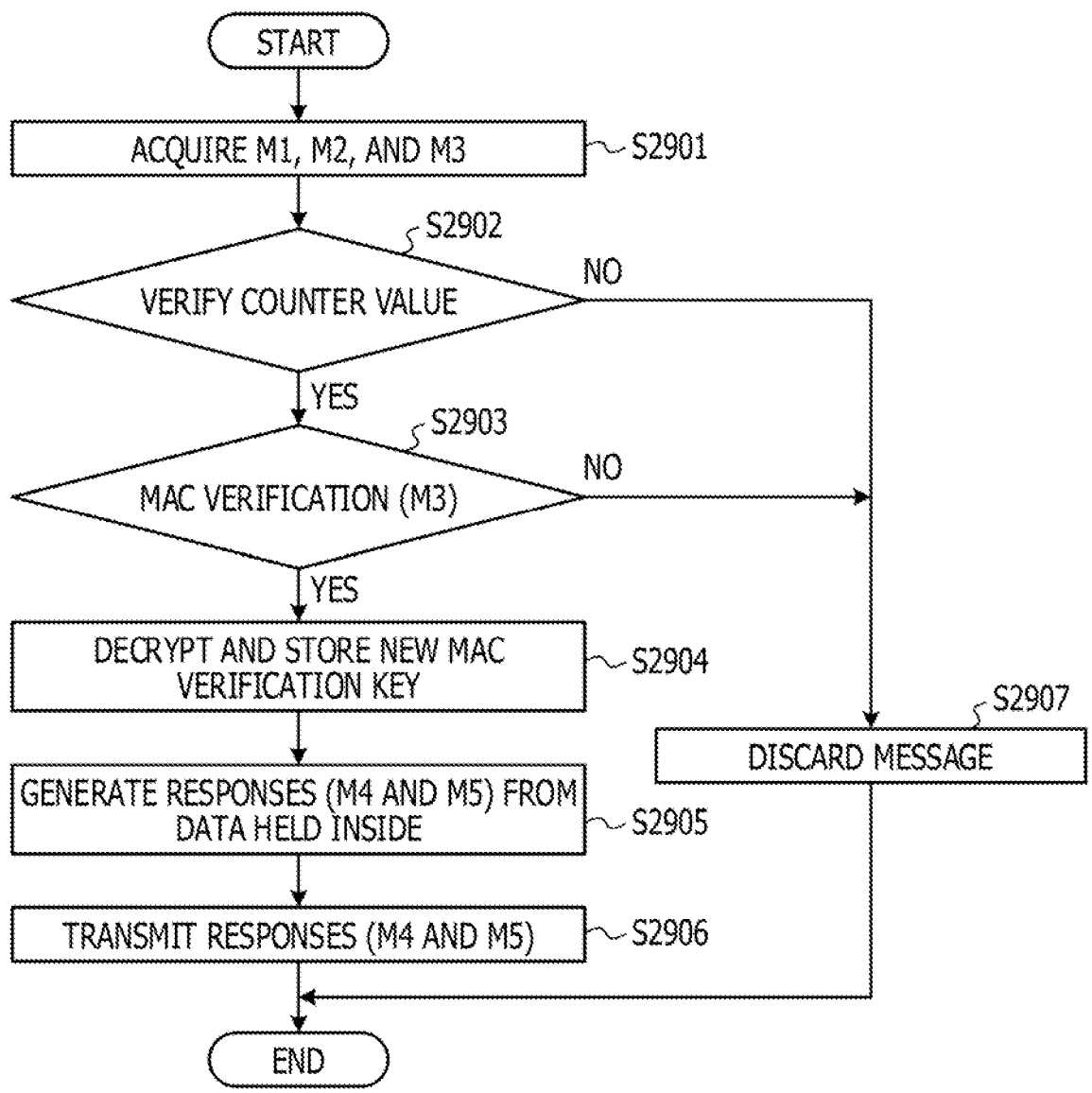
FIG. 29 is a diagram illustrating key storage processing executed by the control unit of the ECU according to the embodiment.

FIG. 29 is a diagram illustrating key storage processing executed by the control unit 801 of the ECU 102. For example, when activated, the control unit 801 of the ECU 102 may start the operation flow in FIG. 29.

In S2901, the control unit 801 of the ECU 102 confirms the CAN-ID of the destination of the message transmitted on the CAN network and collects a message having a CAN-ID of a processing target. Then, in a case where the collected message is an M1 message, the control unit 801 of the ECU 102 confirms whether or not the CAN-ID in the data field of the M1 message is a CAN-ID to be processed. In a case of the CAN-ID to be processed, the control unit 801 of the ECU 102 acquires the collected M1, M2, and M3 messages as processing targets.

In S2902, the control unit 801 of the ECU 102 verifies whether or not the counter value included in the M2 message and the counter value of the entry in the CAN communication information 1001 including the CAN-ID specified in the data field of the M1 message are within a predetermined allowable range. In a case where the counter values are within the allowable range and the verification is successfully performed (YES in S2902), the flow proceeds to S2903

In S2903, the control unit 801 of the ECU 102 generates a MAC value from the M1 and the M2 messages by the common key and verifies whether or not the generated MAC value coincides with the MAC value included in the M3 message. In a case where the MAC values coincide with each other and the verification is successfully performed (YES in S2903), the flow proceeds to S2904.

In S2904, the control unit 801 of the ECU 102 decrypts an encrypted new key included in the M2 message by the common key. Then, the control unit 801 of the ECU 102 stores the acquired new key in the key slot of the CAN communication information 1001 including the CAN-ID specified in the data field of the M1 message.

In S2905, the control unit 801 of the ECU 102 generates an M4 and M5 messages. For example, the control unit 801 of the ECU 102 acquires a counter value of the entry identified by the CAN-ID specified in the data field of the M1 message from the CAN communication information 1001. Then, the control unit 801 of the ECU 102 generates the M4 message including a UID set to the ECU 102, a slot where the new key is stored, and the acquired counter value in the data field. Furthermore, the control unit 801 of the ECU 102 generates a MAC value generated from the M4 message by using the common key and the M5 message including the MAC value in the data field.

In S2906, the control unit 801 of the ECU 102 transmits the M4 and M5 messages to the CAN network, and this operation flow is terminated.

Furthermore, in a case where the verification of the counter value fails in S2902 (NO in S2902) or in a case where the MAC verification fails in S2503 (NO in S2903), the flow proceeds to S2907. In S2907, the control unit 801 of the ECU 102 discards the M1, M2, and M3 messages collected in S2901, and this operation flow is terminated.

As described above, according to the embodiment, the data field of the M1 message specifies the CAN-ID of the message using the key distribution target encryption key for verification. Therefore, for example, unlike a case where the ECU 102 is individually specified by the UID as described in FIG. 6 and the M1, the M2, and the M3 messages are transmitted, it is possible to request the key exchange to all the ECUs 102 related to the transmission of the message specified by the CAN-ID at one time. Then, the respective key distribution target ECUs 102 can execute key exchange processing in parallel. Therefore, a network load of the communication between the ECUs can be reduced. Furthermore, an efficiency in the encryption key update can be improved.

Moreover, according to the embodiment, the ECU 102 can request the master ECU 104 to distribute the key by using the M0 message. Therefore, for example, in a case where the ECU 102 receives an attack, the key can be quickly distributed, and high security can be maintained.

Note that, in the above embodiment, an example has been described in which the M0 message starts the key distribution. However, the embodiment is not limited to this. For example, in another embodiment, the master ECU 104 receives specification of the key-distribution-target CAN-ID and may execute processing for distributing the key to the CAN-IDs specified in S1206 in FIG. 12 and in S2704 in FIG. 27. In this case, it is not necessary to use the M0 message.

Although the embodiment has been described above, the embodiment is not limited to this. For example, the operation flow described above is only exemplary, and the embodiment is not limited to this. If possible, the operation flow may be executed by changing the order of processing, may include another processing, or a part of processing may be omitted. For example, the processing in S2702 and S2703 in FIG. 27, the processing in S2704 and S2705, the processing in S2802 and S2803 in FIG. 28, and the processing in S2902 and S2903 in FIG. 29 may be executed by switching the order of the processing.

Moreover, in the embodiment described above, the ECU 102 and the master ECU 104 are, for example, mounted in a vehicle. However, the embodiment is not limited to this. In another embodiment, for example, it is not necessary for the master ECU 104 to be an ECU mounted on a vehicle, and the master ECU 104 may be a server on a network connected to the ECU 102 mounted in the vehicle via a cellular line.

Furthermore, in the above embodiment, for example, an example has been described in which the common key is used to encrypt the new key and the counter value. However, the embodiment is not limited to this. For example, in another embodiment, old encryption key to be updated may be used instead of the common key.

Furthermore, for example, for a case where the verification of the counter value and the verification of the MAC fail in the above embodiment, the control unit 701 of the master ECU 104 may manage an elapsed time from the transmission of the M1, the M2, and the M3 messages by a timer. Then, in a case where the M4 and the M5 messages that are the responses are not received within a period equal to or longer than an arbitrary threshold, the control unit 701 of the master ECU 104 may retransmit the M1, the M2, and the M3 messages.

Furthermore, the hardware configuration for implementing the ECU 102 described with reference to FIG. 2 is an example, and the embodiment is not limited to this. For example, a part or all of the functional units described above may be implemented as hardware including FPGA and SoC. FPGA is an abbreviation for field programmable gate array. SoC is an abbreviation for System-on-a-chip.

Several embodiments have been described above. However, an embodiment is not limited to the embodiments described above, and it should be understood that the embodiment include various modifications and alternatives of the embodiments described above. For example, it would be understood that various embodiments can be embodied by modifying components without departing from the spirit and scope of the embodiment. Furthermore, it would be understood that various embodiments may be implemented by appropriately combining a plurality of components disclosed in the embodiments described above. Moreover, a person skilled in the art would understand that various embodiments can be implemented by deleting or replacing some components from all the components indicated in the embodiments or by adding some embodiments to the components indicated in the embodiments.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A vehicle system comprising:
a plurality of electronic control devices respectively includes a first processor configured to control each unit of a vehicle; and
a management electronic control device that includes a second processor configured to manage the plurality of electronic control devices, wherein
when an encryption key used to verify a message is updated to another encryption key, the second processor transmits a first message that includes a controller area network identifier (CAN-ID) that identifies the message and a second message that includes the another encryption key to a network, and
when the CAN-ID of the message included in the first message is a CAN-ID to be processed, the first processor updates the encryption key used to verify the message to the another encryption key included in the second message.

2. The vehicle system according to claim 1, wherein
when requesting to update the encryption key used to verify the message, a first electronic control device of the plurality of electronic control devices transmits a third message including the CAN-ID for identifying the message to the network.

3. The vehicle system according to claim 1,
wherein the second processor is configured to generate the another encryption key when a predetermined period has elapsed from a generation time of the encryption key.

4. The vehicle system according to claim 1,
wherein the first message includes an unique identifier (UID) assigned to a target electronic control device that updates the encryption key, and a slot where the encryption key is stored.

5. The vehicle system according to claim 4,
wherein the first processor included in an electronic control device of the plurality of electronic control devices is configured to acquire the second message when the UID included in the first message matches with the UID assigned to the electronic control device.

6. The vehicle system according to claim 1,
wherein the second message includes counter value for preventing a replay.

7. A key distribution method executed by a vehicle system that includes a plurality of electronic control devices used to control each unit of a vehicle and a management electronic control device configured to manage the plurality of electronic control devices, the key distribution method comprising:
when an encryption key used to verify a message is updated to another encryption key, transmitting, by a second processor included in the management electronic control device, a first message including a controller area network identifier (CAN-ID) that identifies the message and a second message that includes the another encryption key; and
when the CAN-ID of the message included in the first message is a CAN-ID to be processed, updating, by a first processor included in at least one of the plurality of electronic control devices, the encryption key used to verify the message to the another encryption key included in the second message.

8. The key distribution method according to claim 7, further comprising
generating, by the second processor, the another encryption key when a predetermined period has elapsed from a generation time of the encryption key.

9. The key distribution method according to claim 7,
wherein the first message includes an unique identifier (UID) assigned to a target electronic control device that updates the encryption key, and a slot where the encryption key is stored.

10. The key distribution method according to claim 7,
wherein the second message includes counter value for preventing a replay.

* * * * *